(12) United States Patent
Liu et al.

(10) Patent No.: US 11,469,474 B2
(45) Date of Patent: Oct. 11, 2022

(54) BATTERY ASSEMBLY

(71) Applicant: Darfon Electronics Corp., Taoyuan (TW)

(72) Inventors: Chia-Hung Liu, Taoyuan (TW); Chien-Hung Chen, Tongxiao Township (TW)

(73) Assignee: DARFON ELECTRONICS CORP., Taoyuan (TW)

(*) Notice: Subject to any disclaimer, the term of this patent is extended or adjusted under 35 U.S.C. 154(b) by 158 days.

(21) Appl. No.: 16/808,029

(22) Filed: Mar. 3, 2020

(65) Prior Publication Data
US 2021/0126230 A1    Apr. 29, 2021

(30) Foreign Application Priority Data

Oct. 24, 2019    (TW) .................................. 108138493

(51) Int. Cl.
*H01M 50/262*    (2021.01)
*H01M 50/20*    (2021.01)
(Continued)

(52) U.S. Cl.
CPC ........... *H01M 50/262* (2021.01); *B62J 43/13* (2020.02); *B62J 43/20* (2020.02); *B62M 6/90* (2013.01);
(Continued)

(58) Field of Classification Search
IPC ................ H01M 50/244, 50/249, 50/262; B62J 43/13, 43/20; B62M 6/90
See application file for complete search history.

(56) References Cited

U.S. PATENT DOCUMENTS

| 9,611,003 B1 | 4/2017 | Yu et al. |
| 10,170,737 B2 | 1/2019 | Shimoda et al. |

(Continued)

FOREIGN PATENT DOCUMENTS

| CN | 110126968 A | 8/2019 |
| DE | 10 2017005434 A1 | 1/2018 |

(Continued)

OTHER PUBLICATIONS

EPO Website (www.espacenet.com) machine translation of DE 102019104238A1. (Year: 2019).*

(Continued)

*Primary Examiner* — Gregg Cantelmo
(74) *Attorney, Agent, or Firm* — Patterson + Sheridan, LLP

(57) ABSTRACT

A battery assembly includes a battery holding unit and a battery unit removably held by the battery holding unit. The battery unit includes a battery, a first engaging portion, and a second engaging portion. The battery holding unit includes a holding member selectively engaged with the first engaging portion or the second engaging portion to hold the battery unit at a first position or a second position. When the holding member and the first engaging portion relatively move away from each other along a disengagement direction, the battery unit moves along a detachment direction from the first position to the second position at which the holding member engages with the second engaging portion, and the second engaging portion is allowed to move to disengage from the holding member, so that the battery unit moves again along the detachment direction to be removed from the battery holding unit.

20 Claims, 14 Drawing Sheets

(51) Int. Cl.
    *H01M 50/249* (2021.01)
    *H01M 50/244* (2021.01)
    *B62M 6/90* (2010.01)
    *B62J 43/13* (2020.01)
    *B62J 43/20* (2020.01)

(52) U.S. Cl.
    CPC ......... *H01M 50/20* (2021.01); *H01M 50/244* (2021.01); *H01M 50/249* (2021.01); *H01M 2220/20* (2013.01)

(56) References Cited

U.S. PATENT DOCUMENTS

| | | | |
|---|---|---|---|
| 2009/0261134 A1* | 10/2009 | Tetsuka | B62M 6/90 224/412 |
| 2016/0311494 A1 | 10/2016 | Schliewert | |
| 2017/0174095 A1 | 6/2017 | Shieh | |
| 2018/0006277 A1* | 1/2018 | Shimoda | H01M 50/20 |
| 2019/0165347 A1 | 5/2019 | Trif et al. | |

FOREIGN PATENT DOCUMENTS

| | | |
|---|---|---|
| DE | 102016213903 B3 | 1/2018 |
| DE | 102018006690 A1 | 2/2019 |
| DE | 10 2019104238 A1 | 8/2019 |
| JP | 2002117818 A | 4/2002 |
| JP | 2006049194 A * | 2/2006 |
| TW | M458338 U | 8/2013 |
| TW | M514946 U | 1/2016 |
| TW | 201607112 A | 2/2016 |
| TW | M525556 U | 7/2016 |
| TW | M580538 U | 7/2019 |
| TW | M598532 U | 7/2020 |
| WO | 2018019441 A1 | 2/2018 |
| WO | 2019167787 A1 | 9/2019 |

OTHER PUBLICATIONS

Office Action in related application NL 2028716 dated Jan. 5, 2022.

* cited by examiner

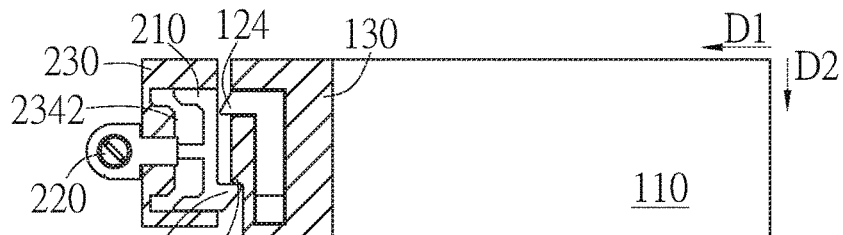
FIG. 10A
FIG. 10B
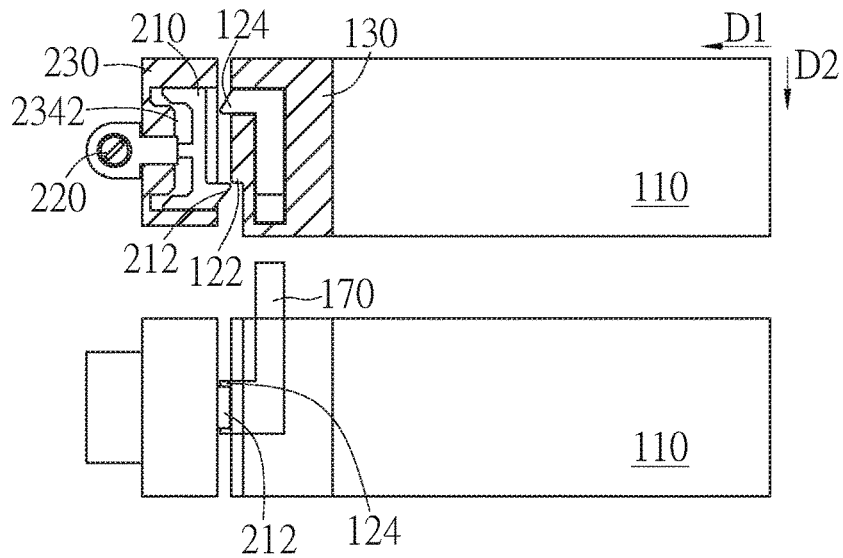
FIG. 10C
FIG. 10D
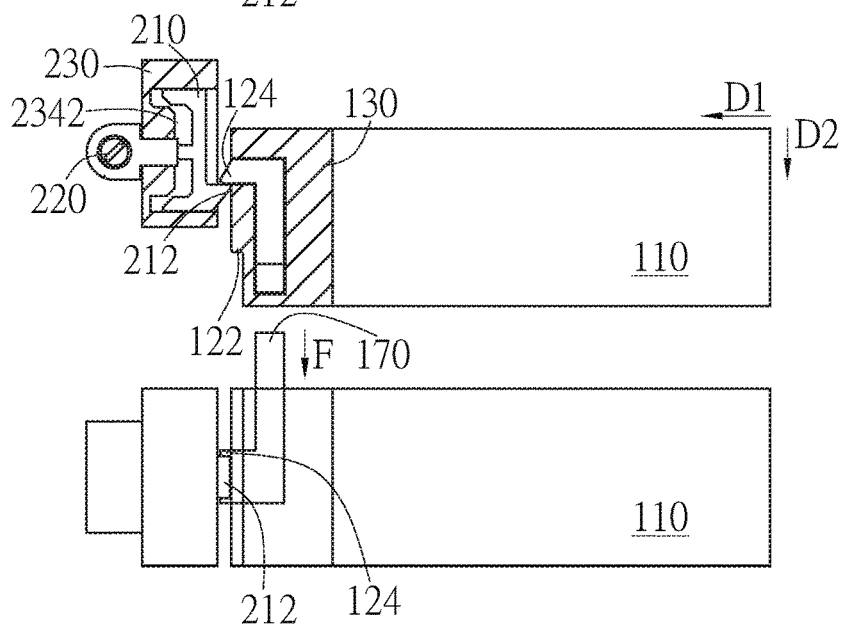
FIG. 10E
FIG. 10F

BATTERY ASSEMBLY

BACKGROUND

Field

Embodiment of the disclosure generally relate to a battery assembly. Particularly, embodiment of the disclosure relate to a battery assembly with two-stage engaging mechanism.

Description of the Related Art

Electric bicycles generally utilize batteries as the power source for motor, and the battery is usually mounted on the bicycle frame. In order to prevent the battery from falling off the bicycle frame, locking mechanism is generally provided to secure the position of the battery. However, when the battery is to be replaced or removed, user generally has to hold the battery by one hand and release the locking mechanism by the other hand. Consequently, when the locking mechanism is unlocked by one hand and the other hand cannot immediately support the battery, the battery will directly fall off the bicycle frame, resulting in high potential of damaging the battery and inconvenience of operation.

SUMMARY

It is an object of the disclosure to provide a battery assembly with two-stage engaging mechanism to prevent the battery unit from directly disengaging from the battery holding unit as the battery unit is to be removed.

In an embodiment, a battery assembly includes a battery unit and a battery holding unit. The battery unit is removably held by the battery holding unit and includes a battery, a first engaging portion, and a second engaging portion. The first engaging portion and the second engaging portion are disposed on an end portion of the battery; the second engaging portion is movable relative to the end portion. The battery holding unit includes a holding member. The holding member is configured to engage with the first engaging portion to hold the battery unit at a first position or to engage with the second engaging portion to hold the battery unit at a second position. When the holding member and the first engaging portion relatively move away from each other along a disengagement direction, the battery unit moves along a detachment direction from the first position to the second position at which the holding member engages with the second engaging portion, and the second engaging portion is allowed to move relative to the end portion to disengage from the holding member, so that the battery unit moves again along the detachment direction to be removed from the battery holding unit.

In an embodiment, the battery assembly further includes a lock device, wherein the lock device is disposed on the battery holding unit to couple with the holding member. When the lock device is in a locked state, the holding member and the first engaging portion are immovable relative to each other to maintain engaging with each other. When the lock device is changed to an unlocked state, the holding member is driven to move along the disengagement direction to disengage from the first engaging portion.

In an embodiment, the battery unit includes a movable member. The first engaging portion and the second engaging portion are disposed on the movable member along the detachment direction. When the battery unit is held at the first position, a projection of the second engaging portion in the detachment direction at least partially falls outside the first engaging portion.

In an embodiment, the movable member is rotatably disposed on the end portion of the battery and further has an operation portion. The first engaging portion is disposed between the second engaging portion and the operation portion. The operation portion is operated to rotate the movable member, so that the second engaging portion moves away from the holding member to disengage from the holding member.

In an embodiment, the operation portion rotatably couples to an end of the movable member neighboring the first engaging portion.

In an embodiment, the battery unit further includes an action member movably disposed at a side of the battery. The action member is operated under a force to push the operation portion, so that the second engaging portion disengages from the holding member. The force is exerted from a direction substantially perpendicular to the disengagement direction and/or the detachment direction.

In an embodiment, when the force is exerted, the action member deforms or rotates to push the operation portion.

In an embodiment, the second engaging portion is movable relative to the first engaging portion. When the battery unit is held at the second position, the second engaging portion is allowed to move toward the battery with respect to the first engaging portion to disengage from the holding member.

In an embodiment, the second engaging portion is movable relative to the first engaging portion; when the battery unit is held at the first position, a projection of the second engaging portion in the detachment direction at least partially falls outside the first engaging portion. When the battery unit is held at the second position, the second engaging portion is allowed to move relative to the first engaging portion toward a lateral side of the battery, so that the second engaging portion disengages from the holding member by laterally shifting away from the holding member.

In an embodiment, the second engaging portion laterally shifts in a direction substantially perpendicular to the detachment direction and the disengagement direction.

In an embodiment, the battery unit further includes an operation portion disposed corresponding to the second engaging portion. The operation portion is operated under a force to drive the second engaging portion to move relative to the first engaging portion toward the lateral side of the battery, so that the projection of the second engaging portion in the detachment direction does not overlap the holding member.

In an embodiment, the battery assembly further includes a lock device, wherein the lock device is disposed on the battery unit to couple with the first engaging portion. When the lock device is in a locked state, the holding member and the first engaging portion are immovable relative to each other to maintain engaging with each other. When the lock device is changed to an unlocked state, the first engaging portion is driven to move along the disengagement direction to disengage from the holding member.

In an embodiment, when the battery unit is held at the second position, the second engaging portion is allowed to move relative to the holding member toward the battery to disengage from the holding member.

In an embodiment, the battery unit further includes a resilient member disposed between the movable member and the end portion of the battery. The resilient member provides a restoring force to enable the projection of the second engaging portion in the detachment direction to be maintained partially outside the first engaging portion.

In an embodiment, the holding member has an interfering portion and a barrier portion. The holding member selectively engages with the first engaging portion or the second engaging portion by the interfering portion to hold the battery unit at the first position or the second position. When the battery unit is held at the first position, the barrier portion corresponds to the second engaging portion.

In an embodiment, the battery holding unit further includes a base. The holding member is disposed on the base. The base has a barrier portion. When the battery unit is held at the first position, the barrier portion corresponds to the second engaging portion.

In an embodiment, the battery holding unit further includes a base. The holding member is disposed on the base. The battery unit has a guiding groove at the end portion. The base is relatively movable along the guiding groove, so that the battery unit is guided to move relative to the battery holding unit.

In an embodiment, the battery holding unit further includes a base. The holding member is disposed on the base. The battery unit has a recessed portion at the end portion. An outer wall of the base is relatively movable along an inner wall of the recessed portion, so that the battery unit is guided to move relative to the battery holding unit.

In an embodiment, the battery holding unit further includes a base. The holding member is disposed on the base. The base has a guiding surface at a side facing the battery unit. The battery unit has a guiding wall at the end portion. The guiding wall of the battery unit is movable along the guiding surface of the base, so that the battery unit is guided to move relative to the battery holding unit.

In an embodiment, the disengagement direction is substantially perpendicular to the detachment direction.

Compared with the prior art, an embodiment of the battery assembly has a two-stage engaging mechanism between the battery unit and the battery holding unit, not only to enhance the holding effect between the battery unit and the battery holding unit, but also to provide the user sufficient time to release the second-stage engagement of the battery unit and the battery holding unit after the first-stage engagement is released. Consequently, the battery assembly of the disclosure can effectively prevent the battery unit from directly falling off to reduce the chance of damaging the battery unit and to improve the operation convenience.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 10A to 10J are cross-sectional operation views and bottom operation views of the battery assembly in another embodiment of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The disclosure provides a battery assembly, which can be applied to an electric bicycle, but not limited thereto. The battery assembly of the disclosure can be applied to any suitable device, which requires a two-stage engaging mechanism, to provide safe and convenient operations of the battery assembly. Hereinafter, the structure and operation of elements of the battery assembly of the disclosure will be described in detail with reference to the drawings.

Figure 1:
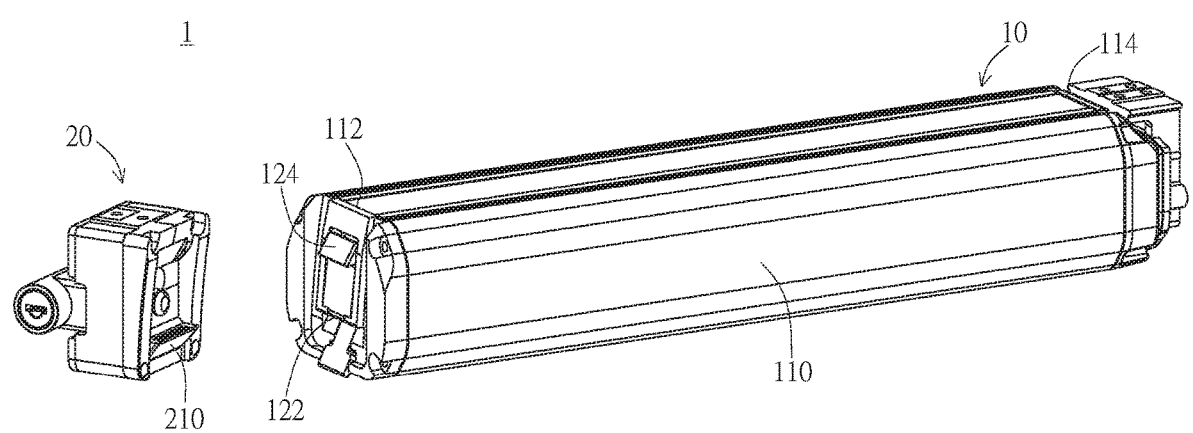
FIG. 1 is a schematic view of the battery assembly in an embodiment of the disclosure.

FIG. 1 is a schematic view of the battery assembly in an embodiment of the disclosure. As shown in FIG. 1, the battery assembly 1 includes a battery unit 10 and a battery holding unit 20. The battery unit 10 is removably held by the battery holding unit 20. The battery unit 10 includes a battery 110, a first engaging portion 122, and a second engaging portion 124. The first engaging portion 122 and the second engaging portion 124 are disposed on an end portion 112 of the battery 110, and the second engaging portion 124 is movable relative to the end portion 112. The battery holding unit 20 includes a holding member 210. The holding member 210 is configured to engage with the first engaging portion 122 to hold the battery unit 10 at a first position or to engaged with the second engaging portion 124 to hold the battery unit 10 at a second position to form a two-stage engaging mechanism. When the holding member 210 and the first engaging portion 122 relatively move away from each other along a disengagement direction D1 (shown in FIG. 3), the battery unit 10 moves along a detachment direction D2 (shown in FIG. 2) from the first position to the second position at which the holding member 210 engages with the second engaging portion 124, and the second engaging portion 124 is allowed to move relative to the end portion 112 to disengage from the holding member 210, so that the battery unit 10 moves again along the detachment direction D2 to be removed from the battery holding unit 20.

Figure 2:
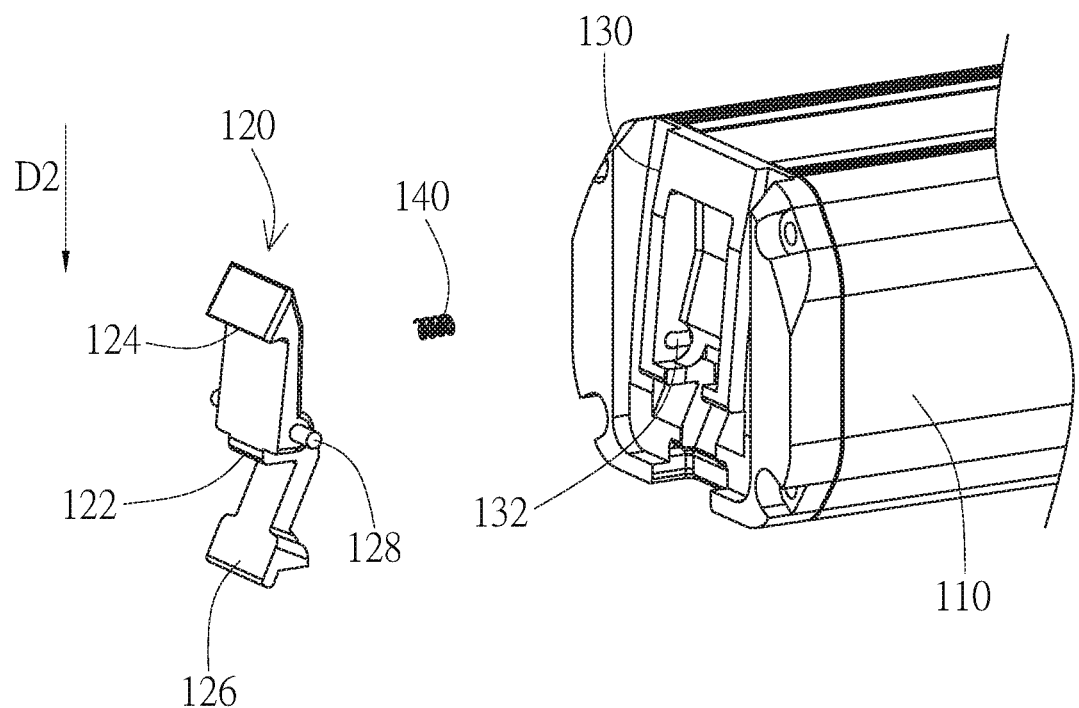
FIG. 2 is a partially enlarged exploded view of FIG. 1.

Referring FIG. 1 and FIG. 2, FIG. 2 is a partially enlarged exploded view of FIG. 1. The battery 110 has two end portions 112 and 114 at two opposite sides in the longitudinal direction. The end portion 112 is adjacent to the battery holding unit 20, and the end portion 114 is away from the battery holding unit 20. In an embodiment, the battery unit 10 further includes a movable member 120. The movable member 120 is rotatably disposed on the end portion 112 of the battery 110. The first engaging portion 122 and the second engaging portion 124 are disposed on the movable member 120 along the detachment direction D2. In an embodiment, the first engaging portion 122 and the second engaging portion 124 are hook-like portions, and in the disengagement direction D1, the distal end of the second engaging portion 124 is preferably at the outer side of the first engaging portion 122. In other words, the projection of the second engaging portion 124 in the detachment direction D2 at least partially falls outside the first engaging portion 122 or at least partially does not overlap the first engaging portion 122; i.e., the second engaging portion 124 protrudes closer to the battery holding unit 20 than the first engaging portion 122.

In an embodiment, the battery 110 can be provided with a battery cap 130 at the end portion 112, and a pivot mechanism (e.g., pivotal hole and shaft) is provided between the battery cap 130 and the movable member 120, so that the movable member 120 is rotatably connected to the battery cap 130 to be rotatable relative to the end portion 112. For example, the battery cap 130 has a pivotal hole 132, while the movable member 120 has a corresponding shaft 128. The shaft 128 is inserted into the pivotal hole 132, so that the movable member 120 is rotatable relative to the battery cap 130 (or the end portion 112). In an embodiment, the shaft 128 is integrally formed with the movable member 120 and is embodied as a rod extending outward from lateral side of the movable member 120, which is in a plate shape, but not limited thereto. In another, the shaft 128 and the movable member 120 can be formed as separable components. For example, the movable member 120 may have a through hole corresponding to the pivotal hole 132, and the shaft 128 is inserted into the through hole with two ends protruding from two opposite sides of the movable member 120 to function as the rods integrally formed with the movable member 120.

The movable member 120 further has an operation portion 126, and the first engaging portion 122 is disposed between the second engaging portion 124 and the operation portion 126. Specifically, the second engaging portion 124, the first engaging portion 122, and the operation portion 126 are sequentially disposed along the detachment direction D2 along which the battery unit 10 leaves the battery holding unit 20. In other words, the second engaging portion 124, the first engaging portion 122, and the operation portion 126 are located at the upstream, the middle stream, and the downstream along the detachment direction D2, respectively. For example, when the detachment direction D2 is a downward direction, the second engaging portion 124, the first engaging portion 122, and the operation portion 126 are sequentially disposed from top to bottom. The operation portion 126 is operated under a force to drive the movable member 120 to rotate. For example, the operation portion 126 is pushed or pulled by the user to enable the movable member 120 to rotate, so that the second engaging portion 124 correspondingly moves away from the holding member 210.

In an embodiment, the operation portion 126 is a plate portion or a shaft portion extending from the first engaging portion 122 in a direction away from the second engaging portion 124. In an embodiment, the operation portion 126 preferably tilts toward the battery holding unit 20.

Figure 2A:
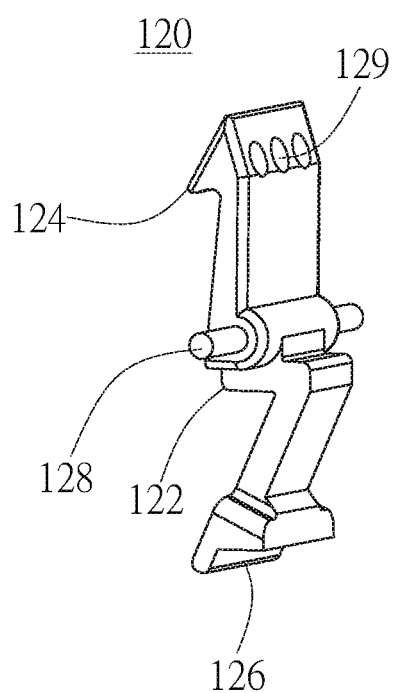
FIG. 2A is a schematic view of the movable member of FIG. 2 from a different viewing angle.

The battery unit 10 may further include a resilient member 140. The resilient member 140 is disposed between the movable member 120 and the end portion 112 of the battery 110. The resilient member 140 is configured to provide a restoring force to enable the projection of the second engaging portion 124 in the detachment direction D2 to be maintained partially outside the first engaging portion 122. The resilient member 140 may be a compressed type or a tensile type spring and disposed corresponding to the second engaging portion 124 or the operation portion 126 to provide the restoring force to maintain the second engaging portion 124 protruding outside the first engaging portion 122. In an embodiment, as shown in FIG. 2, the resilient member 140 is disposed between the movable member 120 and the end portion 112 of the battery 110 corresponding to the second engaging portion 124 and configured to provide a restoring force to push the second engaging portion 124 toward the battery holding unit 20. In this embodiment, the resilient member 140 can be embodied as a compressed spring with two ends coupling the battery cap 130 and the movable member 120, respectively. In an embodiment, as shown in FIG. 2A, the movable member 120 is formed with a positioning hole 129 on one side, i.e., the side facing the battery cap 130. The positioning hole 129 corresponds to the second engaging portion 124 in position and is provided for positioning the resilient member 140. For example, the resilient member 140 can be partially received in the positioning hole 129 to be positioned between the battery cap 130 and the movable member 120, but not limited thereto. The number of the positioning hole 129 can be one or more to accommodate one or more resilient members 140 between the movable member 120 and the end portion 112 of the battery 110. In another embodiment (not shown), the movable member 120 or the battery cap 130 may be provided with a positioning post, and the resilient member 140 is sleeved on the positioning post to be positioned. As shown in FIG. 5B, in another embodiment, the resilient member 140 is disposed on the end portion 112 of the battery 110 corresponding to the operation portion 126. In this embodiment, the resilient member 140 is embodied as a tensile spring to provide a restoring force to pull the operation portion 126 away from the battery holding unit 20 toward the end portion 112 of the battery 110, so that the second engaging portion 124 can be maintained protruding outside the first engaging portion 122 or in an engagement state.

Figure 3:
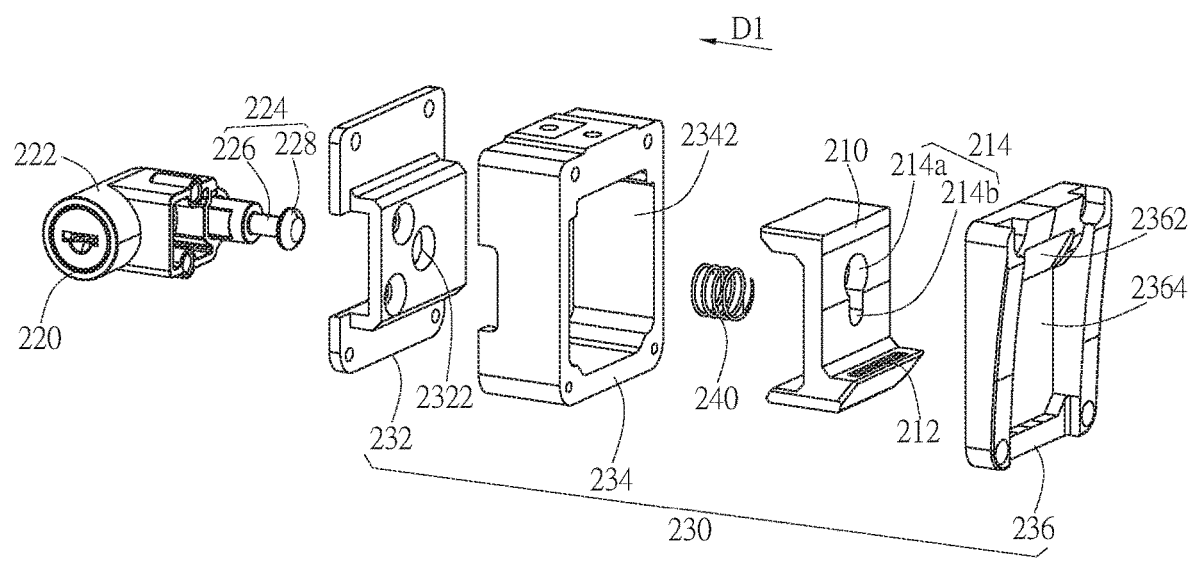
FIG. 3 is an exploded view of the battery holding unit of FIG. 1.

Referring FIG. 1 and FIG. 3, FIG. 3 is an exploded view of the battery holding unit of FIG. 1. In an embodiment, the battery holding unit 20 may further include a lock device 220, a base 230, and a resilient member 240. The lock device 220 is disposed on the battery holding unit 20 to couple with the holding member 210. Specifically, the lock device 220 and the holding member 210 are disposed on two opposite sides of the base 230, and the resilient member 240 is disposed between the lock device 220 and the holding member 210. In response to the locked state or the unlocked state of the lock device 220, the holding member 210 is restricted or allowed to move along the disengagement direction D1. For example, when the lock device 220 is in the locked state, the holding member 210 and the first engaging portion 122 are immovable relative to each other to maintain engaging with each other. When the lock device 220 is changed to the unlocked state, the holding member 210 is driven to move along the disengagement direction D1 to disengage from the first engaging portion 122.

The holding member 210 has an interfering portion 212. The interfering portion 212 protrudes outward, i.e., toward the battery unit 10. The interfering portion 212 can have a hook-like configuration corresponding to the first engaging portion 122 and the second engaging portion 124 to engage with the first engaging portion 122 or the second engaging portion 124. The holding member 210 further has a coupling hole 214, which is configured to couple the lock device 220. In an embodiment, the coupling hole 214 includes a first hole portion 214a and a second hole portion 214b, which communicate with each other. The diameter of the first hole portion 214a is larger than that of the second hole 214b, so that the coupling hole 214 has a gourd shape.

The lock device 220 includes a lock body 222 and a linking shaft 224. The linking shaft 224 is connected to the lock body 222, and in response to the locked state and the unlocked state of the lock body 222, the linking shaft 224 extends or retreats relative to the lock body 222. That is, the linking shaft 224 extends or retreats along the disengagement direction D1. For example, the lock body 222 may be a key lock or a combination lock, which is set at the locked state or the unlocked state by means of the key or the pin number. When the lock body 222 is in the locked state, the linking shaft 224 extends relative to the lock body 222. When the lock body 222 is in the unlocked state, the linking shaft 224 retreats relative to the lock body 222. In other words, the length of the linking shaft 224 in the extending state with respect to the lock body 222 is larger than the length of the linking shaft 224 in the retreating state with respect to the lock body 222. In an embodiment, the linking shaft 224 includes a neck section 226 and a head section 228 along the longitudinal direction (or the extending or retreating direction). In a direction perpendicular to the longitudinal direction, such as a radial direction, the neck section 226 has a width (or diameter) smaller than that of the head section 228. In other words, the neck section 226 is shrunk inward with respect to the head section 228.

The base 230 is preferably a hollow housing and configured to allow the holding member 210 to move in the base 230 relatively. In an embodiment, the base 230 includes a first side board 232, a base body 234, and a second side board 236. The base body 234 is a frame body having an accommodation space 2342 therein, and the first side board 232 and the second side board 236 are disposed on two opposite sides of the base body 234 with respect to the accommodation space 2342, so that the first side board 232, the based body 234, and the second side board 236 together constitute a housing with the accommodation space 2342 enclosed therein. The first side board 232 and the second side board 236 can be connected to the base body 234 by screwing, engaging, adhering, or welding, but not limited thereto. In another embodiment, the first side board 232 and/or the second side board 236 can be integrally formed with the base body 234 to enclose the accommodation space 2342. The first side board 232 is neighboring the lock device 220, while the second side board 236 is neighboring the holding member 210. The first side board 232 has a through hole 2322, and the second side board 236 has an opening 2364. The through hole 2322 and the opening 2364 communicate with the accommodation space 2342. The size of the through hole 2322 preferably corresponds to the linking shaft 224 to allow the linking shaft 224 to pass therethrough, and the size of the opening 2364 corresponds to the holding member 210 to allow the holding member 210 to extend outward or retreat inward.

The lock device 220 is disposed at the outer side of the first side board 232, and the linking shaft 224 is inserted into the accommodation space 2342 from the through hole 2322. The resilient member 240 is disposed between the first side board 232 and the holding member 210 and is sleeved on the linking shaft 224. The size of the first hole portion 214a corresponds to the head section 228 of the linking shaft 224, and the size of the second hole portion 214b corresponds to the neck portion 226. As such, the linking shaft 224 is inserted into the coupling hole 214 via the first hole portion 213a to position the head section 228 at the holding member 210 neighboring the second side board 236 and to position the neck section 226 within the first hole portion 214a. During assembling, the linking shaft 224 is moved from the first hole portion 214a to the second hole portion 214b, so that the neck section 226 is engaged with the second dhole portion 214b, and the linking shaft 224 is stably engaged with the holding member 210 to form a linking mechanism with the interfering portion 212 being exposed at the opening 2364.

Figure 4A:
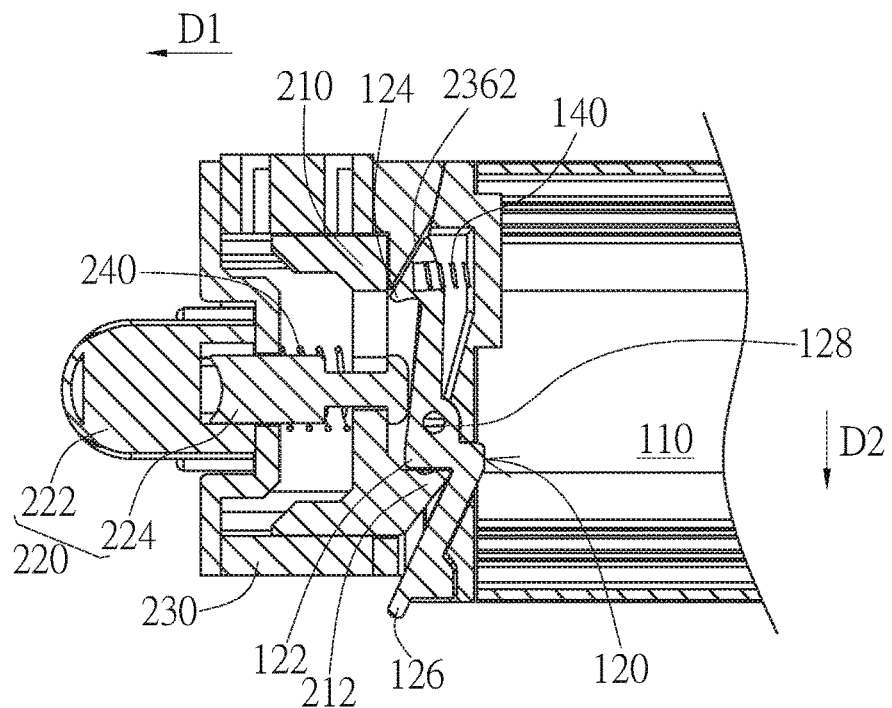
FIGS. 4A and 4B are schematic views of the battery unit held by the battery holding unit at the first position and the second position, respectively.
Figure 4B:
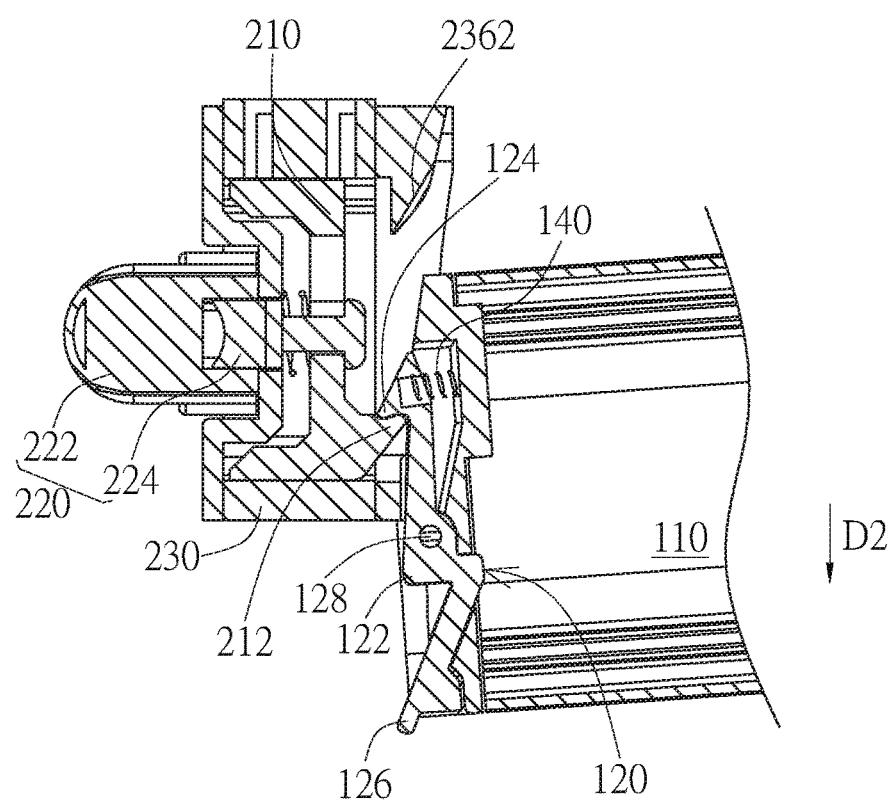

Referring to FIGS. 4A and 4B, FIGS. 4A and 4B are schematic cross-sectional views of the battery unit held by the battery holding unit at the first position and the second position, respectively. As shown in FIG. 4A, when the holding member 210 engages with the first engaging portion 122, the battery unit 10 is held by the battery holding unit 20 at the first position. The first position is referred to a position that the battery unit 10 is combined with the battery holding unit 20 and locked by the battery holding unit 20. For example, at the first position, the lock device 220 can be operated to be in the locked or unlocked state. When the lock device 220 is in the locked state, the linking shaft 224 is in the extending state and immovable relative to the lock body 222, so that the holding member 210 and the first engaging portion 122 cannot relatively move away from each other along the disengagement direction D1 and are maintained engaging with each other. As such, the battery unit 10 is locked and held by the battery holding unit 20. In this embodiment, the base 230 may have a barrier portion 2362, such as a barrier surface. When the battery unit 10 is held at the first position, the barrier portion 2362 corresponds to (or blocks) the second engaging portion 124 to further limit the movement of the movable member 120, so as to enhance the engagement of the holding member 210 and the first engaging portion 122.

As shown in FIG. 4B, when the lock device 220 is changed from the locked state to the unlocked state, the linking shaft 224 moves (or retreats) toward the lock body 222 to drive the holding member 210 to move along the disengagement direction D1 away from the first engaging portion 122, so as to disengage from the first engaging portion 122. In other words, when the holding member 210 and the first engaging portion 122 relatively move away from each other along the disengagement direction D1, the battery unit 10 is allowed to move along the detachment direction D2 from the first position to the second position at which the holding member 210 engages with the second engaging portion 124. For example, when the holding member 210 and the first engaging portion 122 are disengaged, the battery unit 10 can move downward relative to the battery holding unit 20 due to gravity and is held at the second position by the second engaging portion 124 engaging with the holding member 210. When the battery unit 20 is held at the second position, the movable member 120 is allowed to move relative to the end portion 112 of battery 110 to enable the second engaging portion 124 to disengage from the holding member 210, so that the battery unit 10 is able to move again along the detachment direction D2 to be removed from the battery holding unit 20. In this embodiment, the disengagement direction D1 is substantially perpendicular to the detachment direction D2. That is, the disengagement direction D1 and the detachment direction D2 can be two orthogonal directions, but not limited thereto. In other embodiments, the disengagement direction D1 and the detachment direction D2 may include an angle larger than or smaller than 90 degrees.

Figure 5A:
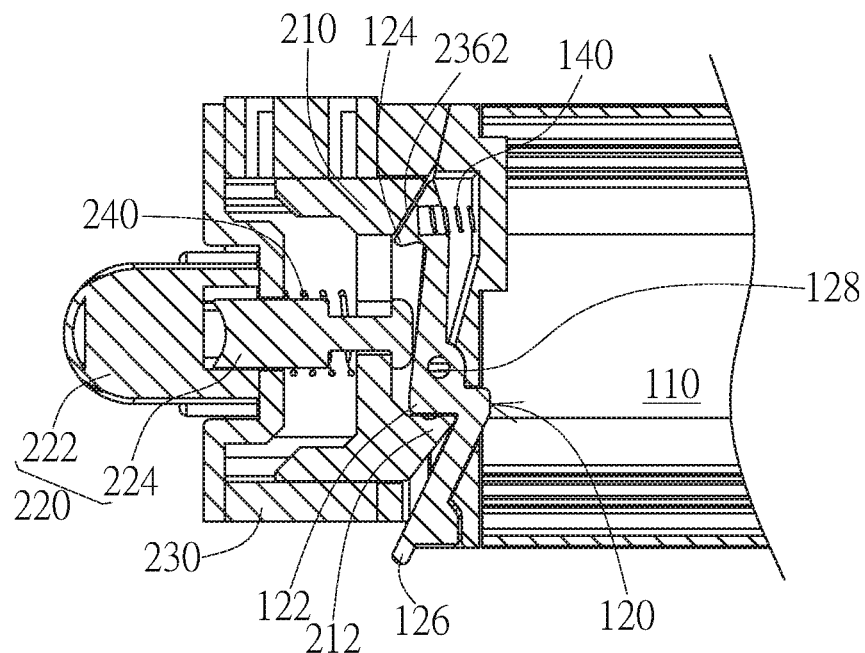
FIGS. 5A and 5B are partial cross-sectional views of the battery assembly in other embodiments of the disclosure.
Figure 5B:
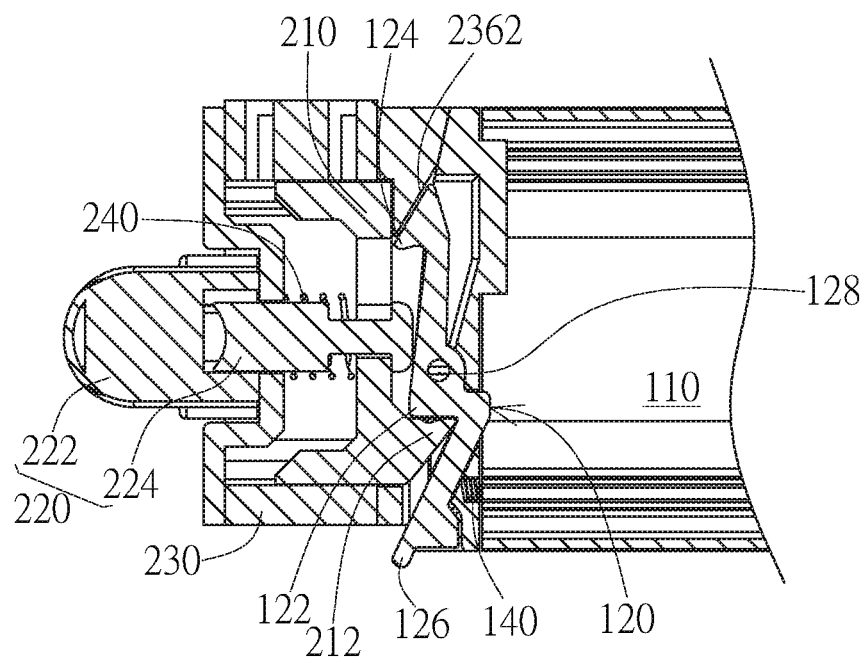

FIG. 5A is a partial cross-sectional view of the battery assembly in another embodiment of the disclosure. In this embodiment, the barrier portion 2362 can be optionally disposed on the holding member 210. As shown in FIG. 5A, the holding member 210 has the interfering portion 212 and a barrier portion 2362. The interfering portion 212 and the barrier portion 2362 are disposed on two opposite sides of the holding member 210. Specifically, the interfering portion 212 and the barrier portion 2362 are disposed along the detachment direction D2 of the battery unit 10, wherein the barrier portion 2362 is located at the upstream and the interfering portion 212 is at the downstream. As shown in FIGS. 4A and 5A, the barrier portion 2362 is an inclined surface inclining, from top to bottom, toward the inner side of the base 230 to correspond to the second engaging portion 124, which has a hook-like configuration, but not limited thereto. In other embodiments, the barrier portion can be a vertical surface. In the embodiment that the battery holding unit 20 has the barrier portion 2362 and the battery unit 10 has the resilient member 140, when the battery unit 10 is held at the first position, the barrier portion 2362 can press against the movable member 120 (or the second engaging portion 124) and the resilient member 140 is compressed, so the second engaging portion 124 does not necessarily protrude closer to the holding member 210 than the first engaging portion 122. In the case that the holding member 210 and the first engaging portion 122 disengage from each other and the second engaging portion 124 escapes from the barrier portion 2362, the resilient member 140 can provide the restoring force to enable the second engaging portion 124 to move toward the holding member 210, so as to protrude closer to the holding member 210 than the first engaging portion 122 and to engage with the holding member 210.

Figure 6A:
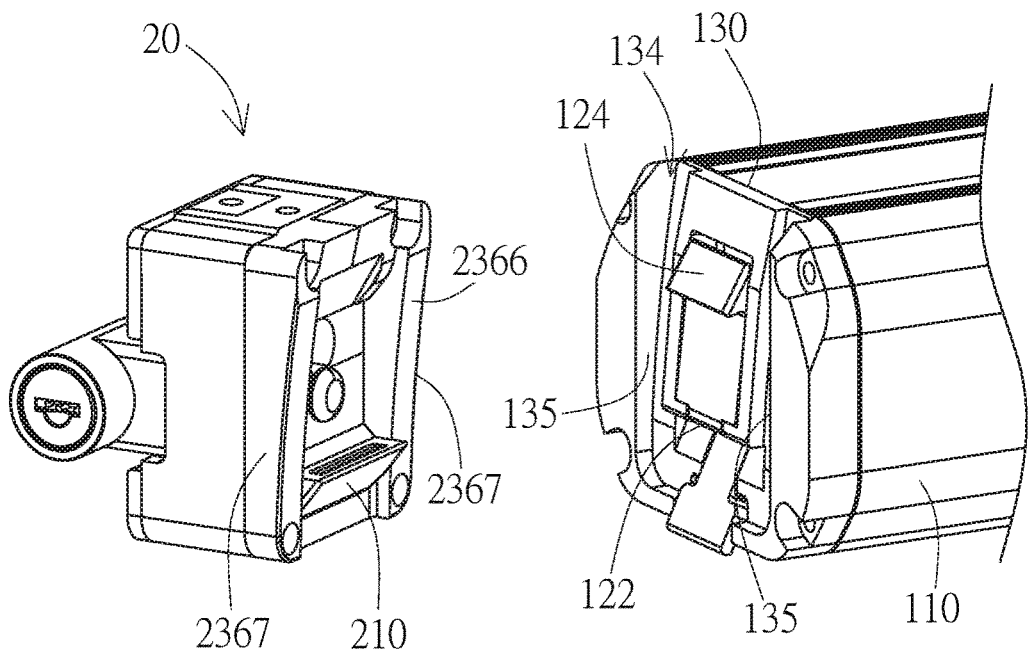
FIGS. 6A and 6B are partial schematic views of the battery assembly in other embodiments of the disclosure.
Figure 6B:
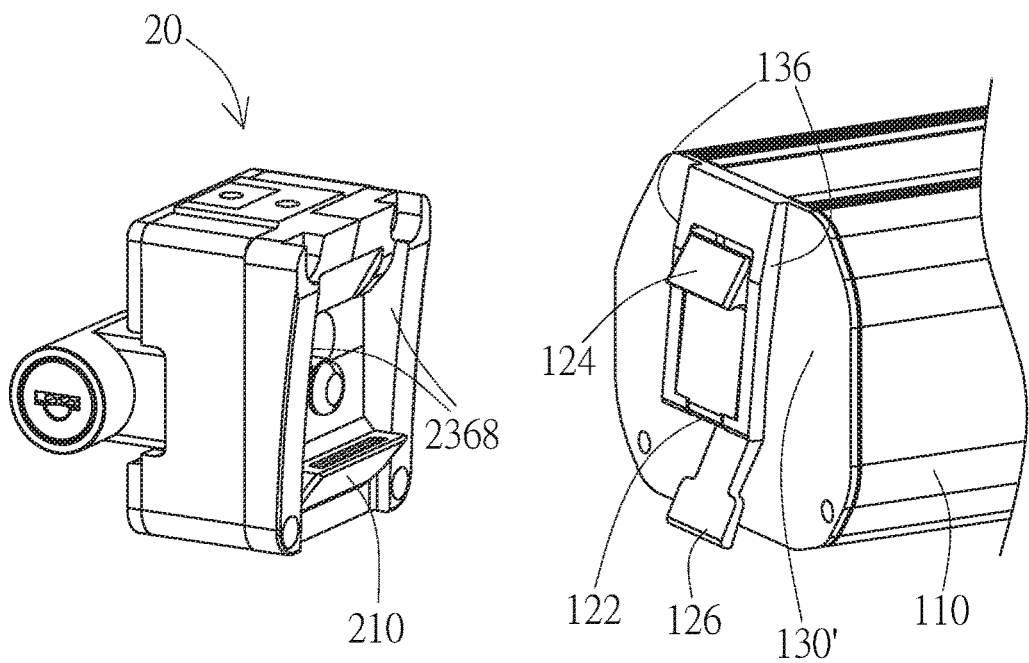

Moreover, the battery unit 10 and the battery holding unit 20 preferably have corresponding guiding structures to improve the guidance of the battery unit 10 moving relative to the battery holding unit 20. FIGS. 6A and 6B are partial schematic views of the battery assembly in other embodiments of the disclosure. As shown in FIG. 6A, the battery unit 10 has a guiding groove 134 at the end portion 112, and the base 230 is relatively movable along the guiding groove 134, so that the battery unit 10 is guided to move relative to the battery holding unit 20. For example, the battery cap 130 can be designed with a surface structure that two guiding grooves 134 are formed at two sides of the movable member 120, and the extending direction of the guiding groove 134 is substantially parallel to the detachment direction (such as D2) of the battery unit 10. Corresponding to the design of the guiding grooves 134, the base 230 can be formed with guiding blocks 2366 at two sides of the second side board 236. When the battery unit 10 moves relative to the battery holding unit 20, the guiding block 2366 moves relatively in the guiding groove 134 to achieve the guiding effect. The guiding structures of the battery unit 10 and the battery holding unit 20 are not limited to the guiding grooves and blocks, but can be the structures of guiding wall and guiding surface. In another aspect, the battery unit 10 may have a recessed portion (such as 134) at the end portion 112. The outer wall 2367 of the base 230 can be relatively movable along the inner wall 135 of the recessed portion, so that the battery unit 10 is guided to move relative to the battery holding unit 20. For example, the battery cap 130 can be formed with the recessed portion having a width corresponding to the width of the second side board 236, so that two inner walls of the recessed portion extending along the detachment direction D2 function as the guiding surfaces to correspond to the outer wall 2367 of the second side board 236. As such, when the battery unit 10 moves relative to the battery holding unit 20, the outer wall 2367 of the base 230 relatively moves along the inner wall 135 of the recessed portion to achieve the guiding effect.

As shown in FIG. 6B, the base 230 has a guiding surface 2368 at a side facing the battery unit 10, and the battery unit 10 has a guiding wall 136 at the end portion 112. For example, the guiding surface 2368 can be the inner wall surface of the second side board 236. The guiding wall 136 can be a protruding wall of the battery cap 130', which corresponds to the guiding surface 2368. In this embodiment, the distance between two guiding walls 136 is preferably substantially equal to or slightly less than the distance between the two guiding surfaces 2368. As such, when the battery unit 10 moves relative to the battery holding unit 20, the guiding walls 136 relatively move along the guiding surfaces 2368 to achieve the guiding effect.

Figure 7A:
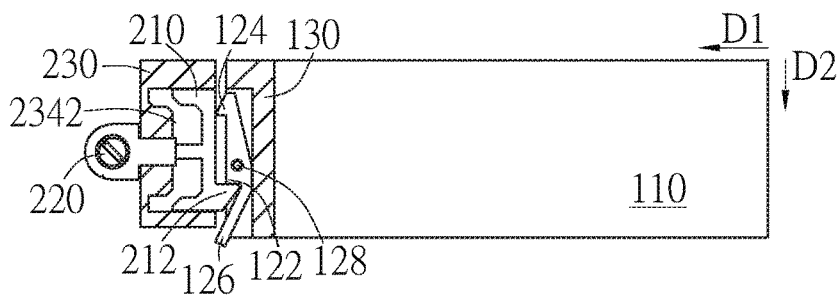
FIGS. 7A to 7E are schematic operation views of the battery assembly in an embodiment of the disclosure.

Hereinafter, referring to FIGS. 7A to 7E, the operation of the battery assembly in an embodiment will be described. As shown in FIG. 7A, the battery unit is substantially completely mounted or secured to the battery holding unit, and the lock device 220 is in the locked state to restrict the movement of the holding member 210. In such a configuration, the interfering portion 212 maintains engaging with the first engaging portion 122 of the battery unit to limit the movement of the battery unit, so that the battery unit is held at the first position, i.e., locked position, at which the battery unit cannot be removed from the battery holding unit.

Figure 7B:
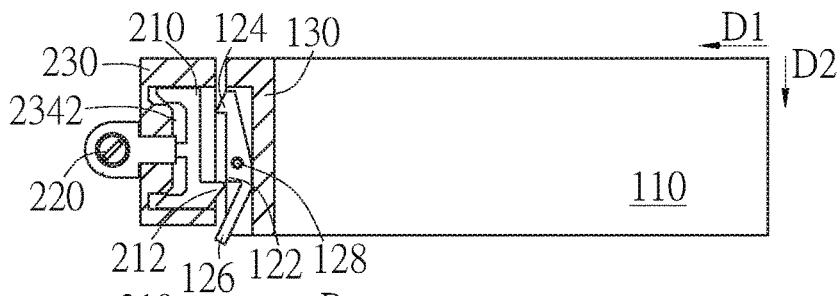
Figure 7C:
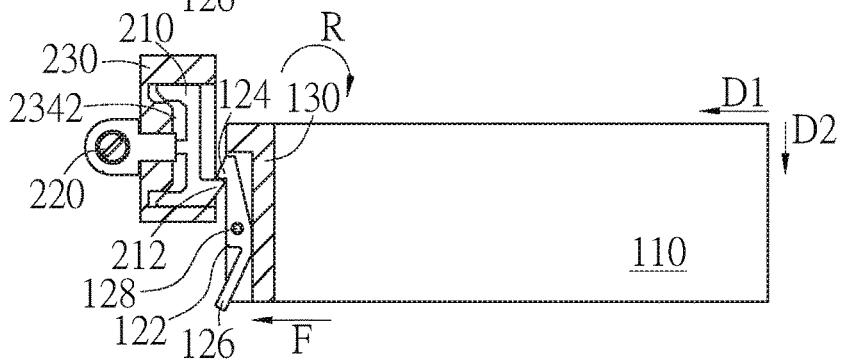

As shown in FIG. 7B, the lock device 220 is changed from the locked state to the unlocked state, and the linking shaft retreats to drive the holding member 210 to move away from the first engaging portion 122 toward the accommodation space 2342, so that the holding member 210 and the first engaging portion 122 are disengaged from each other. In such a configuration, the engagement between the battery unit and the battery holding unit is released, so that the battery unit is allowed to move relative to the battery holding unit, such as move downward due to gravity. Since the second engaging portion 124 protrudes closer to the holding member 210 than the first engaging portion 122, the battery unit moves relative to the battery holding unit to the second position at which the interfering portion 212 engages with the second engaging portion 124, as shown in FIG. 7C. In other words, the lock device 220 is changed from the locked state to the unlocked state to drive the holding member 210 to move along the disengagement direction D1, so that the interfering portion 212 moves away from the moving path of the first engaging portion 122, and the holding member 210 is still in the moving path of the second engaging portion 124. As such, the battery unit moves along the detachment direction D2 until the second engaging portion 124 interfering (or engaging) with the interfering portion 212 and then stops to be held at the second position.

Figure 7D:
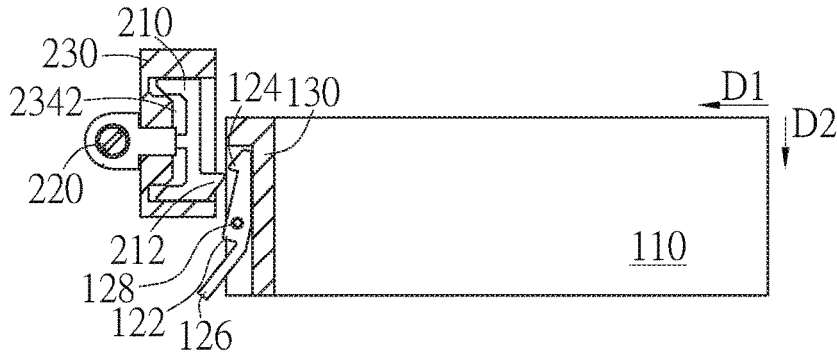
Figure 7E:
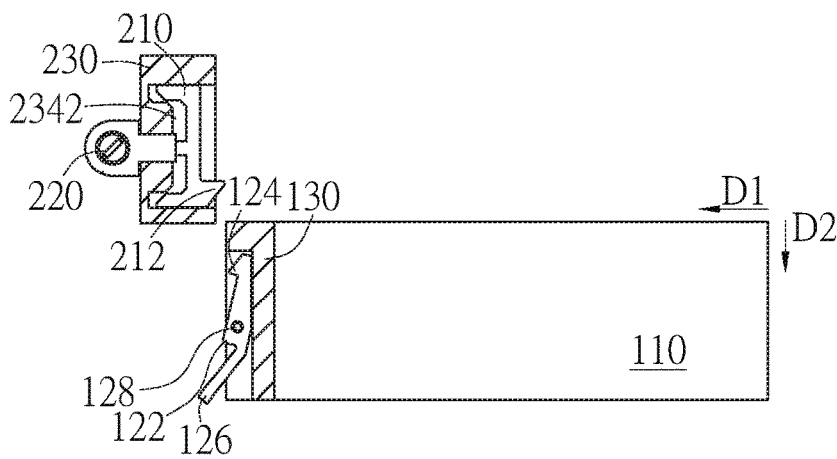

As shown in FIG. 7C, when the battery unit is held at the second position, since the second engaging portion 124 can move relative to the end portion of the battery 110, the external force F can be exerted on the operation portion 126, for example, user pushes the operation portion 126 along a direction toward the battery holding unit, so that the movable member 120 can rotate along the clockwise direction R with the shaft 128 as the rotation axis, and the second engaging portion 124 is driven to rotate away from the interfering portion 212, as shown in FIG. 7D. In such a configuration, the engagement between the battery unit and the battery holding unit is released, so that the battery unit is again allowed to move relative to the battery holding unit along the detachment direction D2, such as move downward due to gravity, to be removed from the battery holding unit, as shown in FIG. 7E.

Moreover, when the lock device 220 is set in the unlocked state, by operating in a reverse sequence according to FIGS. 7A to 7E, the battery unit can be held or mounted on the battery holding unit. Moreover, when the external force F is released, the resilient member 140 (shown in previous embodiments) can provide a restoring force to the movable member 120, so that the movable member 120 rotates in a reverse direction to enable the second engaging portion 124 to move toward the battery holding unit. Optionally, by the inclined surface design of the second engaging portion 124 and the interfering portion 212, the battery unit can be pushed toward the mounting direction, i.e., the reverse direction of the disengagement direction D1, to be mounted on the battery holding unit without exerting the external force F to the operation portion 126.

Figure 8A:
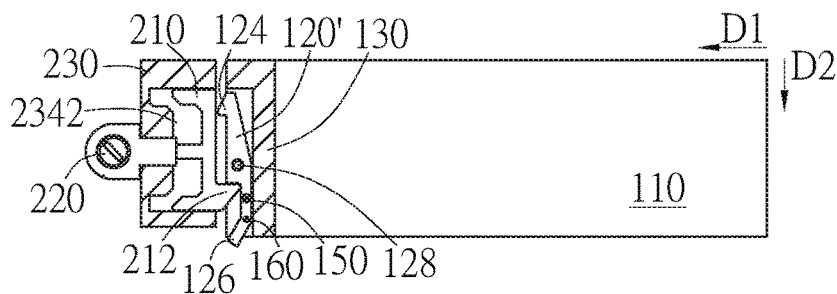
FIGS. 8A to 8E are schematic operation views of the battery assembly in another embodiment of the disclosure.

FIGS. 8A to 8E are schematic operation views of the battery assembly in another embodiment of the disclosure. As shown in FIG. 8A, in this embodiment, the operation portion 126 rotatably couples to an end of the movable member 120' neighboring the first engaging portion 122. The operation portion 126 is operated under a force, such as pushed or pressed by the user, to enable the movable member 120' to rotate, so that the second engaging portion 124 disengages from the holding member 210. Specifically, the operation portion 126 and the movable member 120' are two components coupling with each other. The movable member 120' has the first engaging portion 122 and the second engaging portion 124 separately disposed on two opposite ends, and the operation portion 126 rotatably couples to the movable member 120', so that the second engaging portion 124, the first engaging portion 122 and the operation portion 126 are arranged in a similar configuration as the previous embodiments. In this embodiment, the operation portion 126 may have a curved shape, such as an arch shape. The operation portion 126 rotatably couples to the battery cap 130 (or the end portion) at the curve portion (or bending point) by means of pivot 160, and one end of the operation portion 126 rotatably couples to the movable member 120' by means of pivot 150, so that the operation portion 126 is rotatable relative to the end portion to drive the movable member 120' to rotate.

Hereinafter, the actions of the operation portion 126 will be illustrated with reference to FIGS. 8A to 8E, and the operation of other components of the battery assembly can be referred to the related descriptions of the previous embodiments. As shown in FIG. 8A, the battery unit is substantially completely mounted or secured to the battery holding unit, and the lock device 220 is in the locked state to restrict the movement of the holding member 210. In such a configuration, the interfering portion 212 maintains engaging with the first engaging portion 122 of the battery unit to limit the movement of the battery unit, so that the battery unit is held at the first position, i.e., locked position, at which the battery unit cannot be removed from the battery holding unit. In such a configuration, the operation portion 126 is bent toward the battery holding unit, i.e., the free end of the operation portion 126 is closer to the battery holding unit than the pivot 160.

Figure 8B:
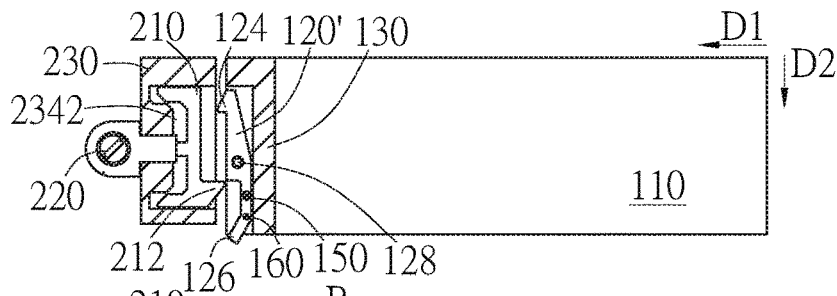

As shown in FIG. 8B, the lock device 220 is changed from the locked state to the unlocked state, and the linking shaft retreats to drive the holding member 210 to move away from the first engaging portion 122 along the disengagement direction D1 toward the accommodation space 2342, so that the holding member 210 and the first engaging portion 122 are disengaged from each other. In such a configuration, the engagement between the battery unit and the battery holding unit is released, so that the battery unit is allowed to move relative to the battery holding unit along the detachment direction D2, such as move downward due to gravity. Since the second engaging portion 124 protrudes closer to the holding member 210 than the first engaging portion 122, the battery unit moves relative to the battery holding unit to the second position at which the interfering portion 212 engages with the second engaging portion 124, as shown in FIG. 8C.

Figure 8C:
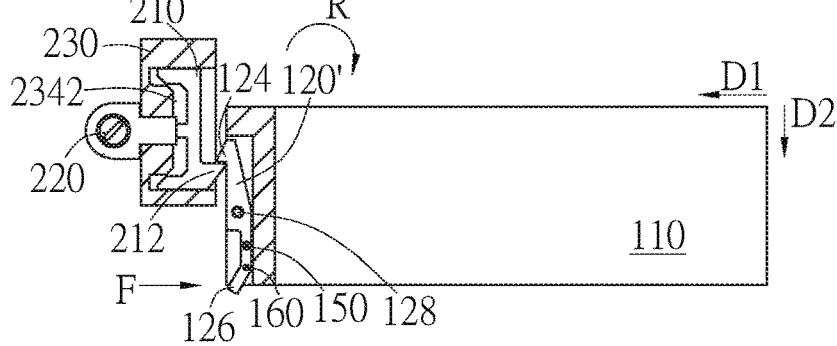
Figure 8D:
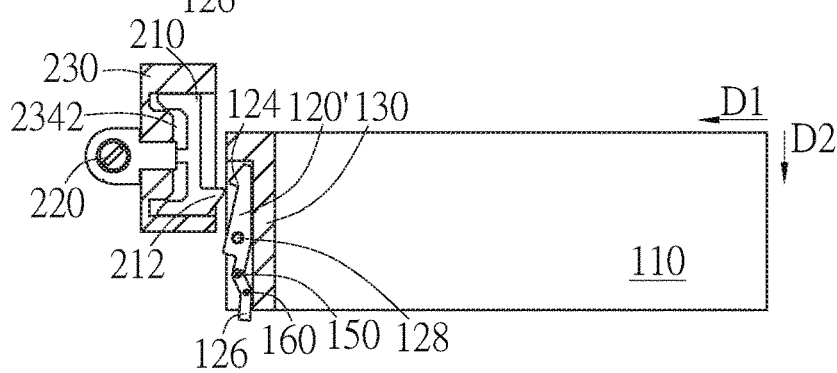
Figure 8E:
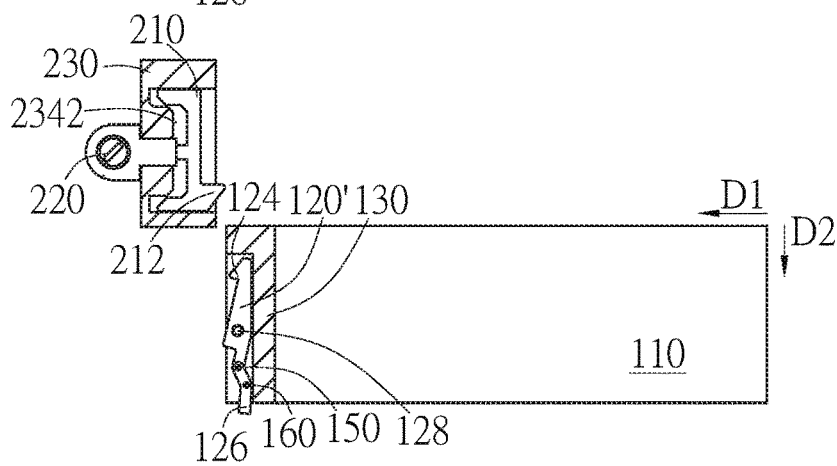

As shown in FIG. 8C, when the battery unit is held at the second position, since the second engaging portion 124 can move relative to the end portion of the battery 110, the external force F can be exerted on the operation portion 126, for example, user pushes or pulls the operation portion 126 along a direction away from the battery holding unit, so that the operation portion 126 rotates with the pivot 160 as the rotation axis to drive the end of the movable member 120', which is closer to the first engaging portion 122, to move toward the battery holding unit. That is, the movable member 120' rotates along the clockwise direction R with the pivot 128 as the rotation axis, and the second engaging portion 124 is driven to rotate away from the interfering portion 212, as shown in FIG. 8D. In such a configuration, the engagement between the battery unit and the battery holding unit is released, so that the battery unit is again allowed to move relative to the battery holding unit along the detachment direction D2, such as move downward due to gravity, to be removed from the battery holding unit, as shown in FIG. 8E. Moreover, In the case that the battery unit is provided with the resilient member 140 shown in the previous embodiments, after the external force F is released, the resilient member 140 can provide the restoring force to the movable member 120', so that the movable member 120' reversely rotates to enable the second engaging portion 124 to move toward the battery holding unit and drive the operation portion 126 to move to the position where its free end is closer to the battery holding unit than the pivot 160.

Figure 9A:
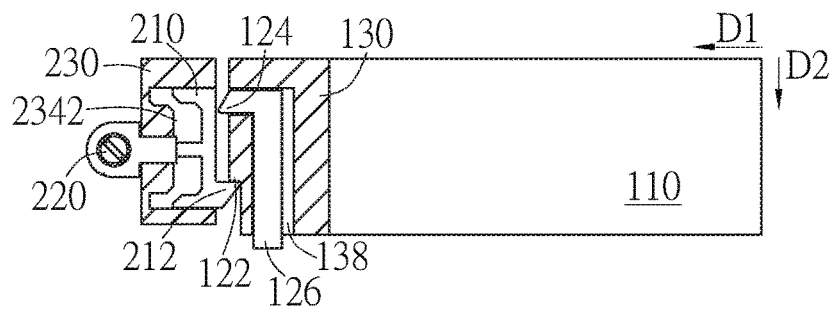
FIGS. 9A to 9E are schematic operation views of the battery assembly in another embodiment of the disclosure.

FIGS. 9A to 9E are schematic operation views of the battery assembly in another embodiment of the disclosure. As shown in FIG. 9A, in this embodiment, the first engaging portion 122 and the second engaging portion 124 are separately disposed on the end portion of the battery 110. In other words, the first engaging portion 122 and the second engaging portion 124 can be two separate components, instead of being integrated to the movable member 120 or 120'. For example, the first engaging portion 122 can be a hook-like portion or an engaging surface integrally formed on the battery cap 130, and the second engaging portion 124 is a component movably disposed on the battery cap 130. In this embodiment, the battery cap 130 is preferably formed with a channel 138, and the second engaging portion 124 is movable in the channel 138 relative to the first engaging portion 122. For example, the middle section of the second engaging portion 124 is located in the channel 138, and two ends of the second engaging portion 124 protrude from the channel 138 outside the battery cap 130 to function as an engaging part for engaging with the holding member 210 and the operation portion 126 for user to operate, respectively. In this embodiment, the second engaging portion 124 moves relative to the battery cap 130 (or the end portion) in a horizontal direction (or in a direction parallel to the longitudinal direction of the battery 110). That is, the moving direction of the second engaging portion 124 is substantially perpendicular to the detachment direction D2 of the battery unit.

Hereinafter, the actions of the second engaging portion 124 will be illustrated with reference to FIGS. 9A to 9E, and the operation of other components of the battery assembly can be referred to the related descriptions of the previous embodiments. As shown in FIG. 9A, the battery unit is substantially completely mounted or secured to the battery holding unit, and the lock device 220 is in the locked state to restrict the movement of the holding member 210. In such a configuration, the interfering portion 212 maintains engaging with the first engaging portion 122 of the battery unit to limit the movement of the battery unit, so that the battery unit is held at the first position, i.e., locked position, at which the battery unit cannot be removed from the battery holding unit. In such a configuration, a projection of the second engaging portion 124 in the detachment direction D2 at least partially falls outside the first engaging portion 122. That is, the second engaging portion 124 protrudes closer to the holding member 210 than the first engaging portion 122.

Figure 9B:
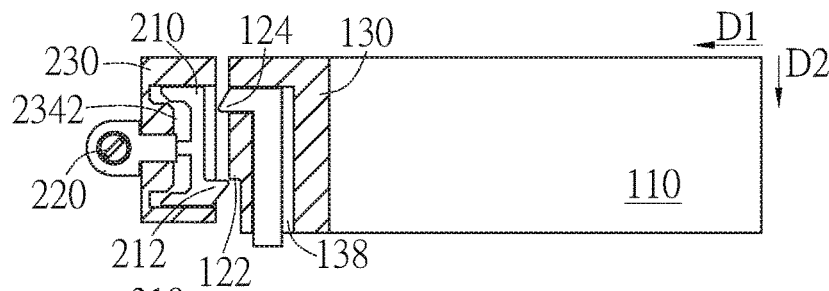

As shown in FIG. 9B, the lock device 220 is changed from the locked state to the unlocked state, and the linking shaft retreats to drive the holding member 210 to move away from the first engaging portion 122 along the disengagement direction D1 toward the accommodation space 2342, so that the holding member 210 and the first engaging portion 122 are disengaged from each other. In such a configuration, the engagement between the battery unit and the battery holding unit is released, so that the battery unit is allowed to move relative to the battery holding unit along the detachment direction D2, such as move downward due to gravity. Since the second engaging portion 124 protrudes closer to the holding member 210 than the first engaging portion 122, the battery unit moves relative to the battery holding unit to the second position at which the interfering portion 212 engages with the second engaging portion 124, as shown in FIG. 9C.

Figure 9C:
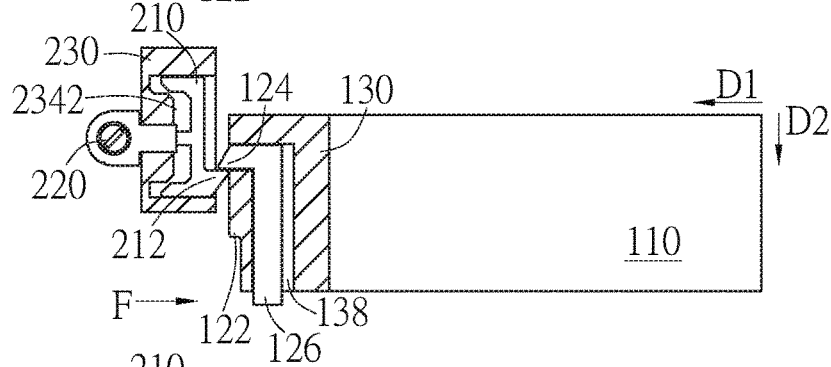
Figure 9D:
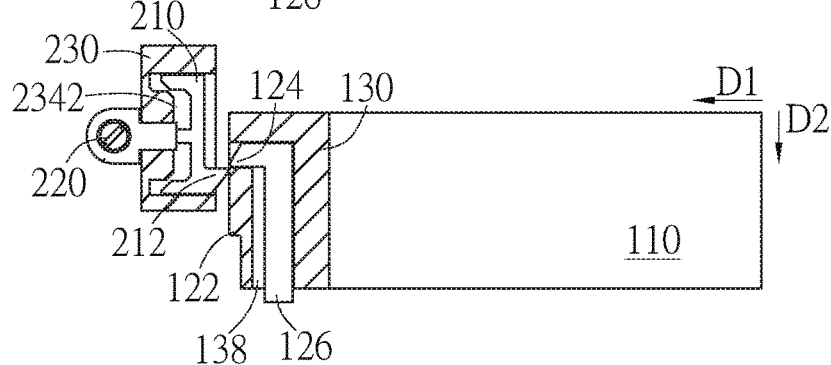
Figure 9E:
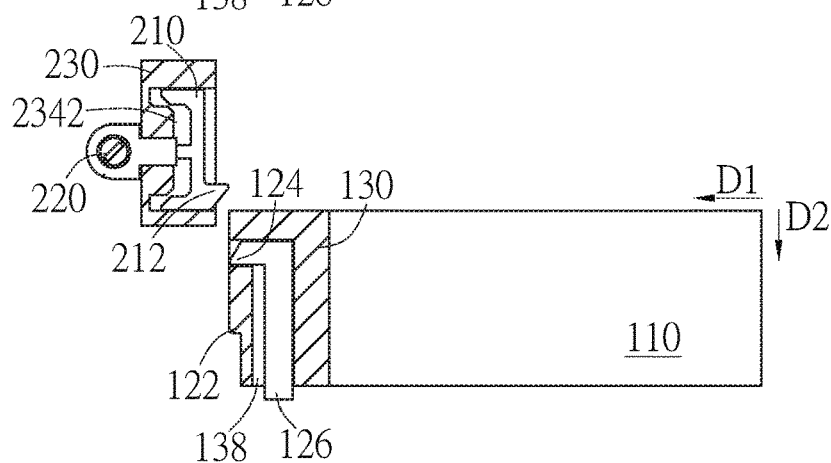

As shown in FIG. 9C, when the battery unit is held at the second position, the second engaging portion 124 is allowed to move relative to the first engaging portion 122 into the battery 110 to release the engagement with the holding member 210. Specifically, when the user exerts the external force F to the operation portion 126 of the second engaging portion 124, for example, the user pushes or pulls the operation portion 126 along a direction away from the battery holding unit, the second engaging portion 124 moves in the channel 138 along the force-exerting direction (or parallel to the moving direction of the holding member 210) to disengage from the interfering portion 212, as shown in FIG. 9D. In other words, the second engaging portion 124 retreats into the battery 110, so that the length of the second engaging portion 124 protruding out of the battery cap 130 toward the holding member 210 is reduced. In such a configuration, the engagement between the battery unit and the battery holding unit is released, so that the battery unit is again allowed to move relative to the battery holding unit along the detachment direction D2, such as move downward due to gravity, to be removed from the battery holding unit, as shown in FIG. 9E. Moreover, In the case that the battery unit is provided with the resilient member 140 shown in the previous embodiments, after the external force F is released, the resilient member 140 can provide the restoring force to the second engaging portion 124, so that the second engaging portion 124 moves in a reverse direction to the position where the second engaging portion 124 protrudes closer to the battery holding unit than the first engaging portion 122.

Figure 10G:
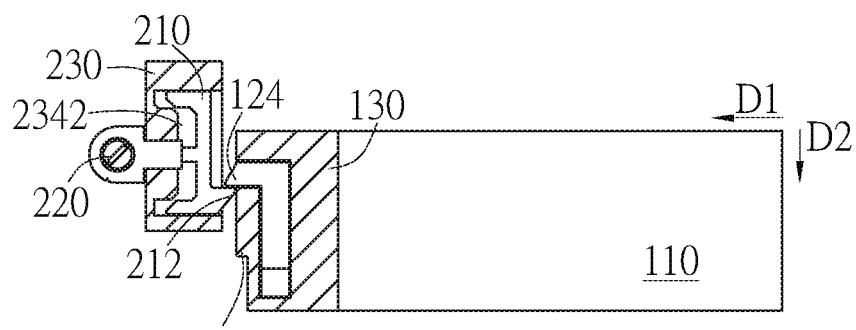

FIGS. 10A to 10J are cross-sectional operation views and bottom operation views of the battery assembly in the detachment direction D2 in another embodiment of the disclosure, wherein FIGS. 10A, 10C, 10E, 10G and 10I are cross-sectional operation views, and FIGS. 10B, 10D, 10F, 10H and 10J are bottom operation views. As shown in FIGS. 10A and 10B, in this embodiment, the first engaging portion 122 and the second engaging portion 124 are two separate components, and the moving direction of the second engaging portion is different from that shown in the embodiment of FIG. 9A. Similar to the embodiment of FIG. 9A, in this embodiment, the first engaging portion 122 can be a hook-like portion or an engaging surface integrally formed on the battery cap 130, and the second engaging portion 124 is a component, which can laterally move with respect to the battery cap 130. The battery unit further includes an action member 170 disposed corresponding to the second engaging portion 124. The action member 170 is operated under a force, such as pushed or pulled by the user, to drive the second engaging portion 124 to move relative to the first engaging portion 122 toward a lateral side of the battery 110. Specifically, the moving direction of the second engaging portion 124 is preferably substantially perpendicular to the detachment direction D2 of the battery unit and the moving direction (e.g. disengagement direction D1) of the holding member 210. In other words, the moving direction of the second engaging portion 124, the disengagement direction D1 of the holding member 210, and the detachment direction D2 of the battery unit can be the X axis direction, the Y axis direction, and the Z axis direction in the XYZ three-dimensional space.

Hereinafter, the actions of the second engaging portion 124 will be illustrated with reference to FIGS. 10A to 10J, and the operation of other components of the battery assembly can be referred to the related descriptions of the previous embodiments. As shown in FIGS. 10A and 10B, the battery unit is substantially completely mounted or secured to the battery holding unit, and the lock device 220 is in the locked state to restrict the movement of the holding member 210. In such a configuration, the interfering portion 212 maintains engaging with the first engaging portion 122 of the battery unit to limit the movement of the battery unit, so that the battery unit is held at the first position, i.e., locked position, at which the battery unit cannot be removed from the battery holding unit. In such a configuration, a projection of the second engaging portion 124 in the detachment direction D2 at least partially falls outside the first engaging portion 122. That is, the second engaging portion 124 protrudes closer to the holding member 210 than the first engaging portion 122.

As shown in FIGS. 10C and 10D, the lock device 220 is changed from the locked state to the unlocked state, and the linking shaft retreats to drive the holding member 210 to move away from the first engaging portion 122 along the disengagement direction D1 toward the accommodation space 2342, so that the holding member 210 and the first engaging portion 122 are disengaged from each other. In such a configuration, the engagement between the battery unit and the battery holding unit is released, so that the battery unit is allowed to move relative to the battery holding unit along the detachment direction D2, such as move downward due to gravity. Since the second engaging portion 124 protrudes closer to the holding member 210 than the first engaging portion 122, the battery unit moves relative to the battery holding unit to the second position at which the interfering portion 212 engages with the second engaging portion 124, as shown in FIGS. 10E and 10F.

Figure 10H:
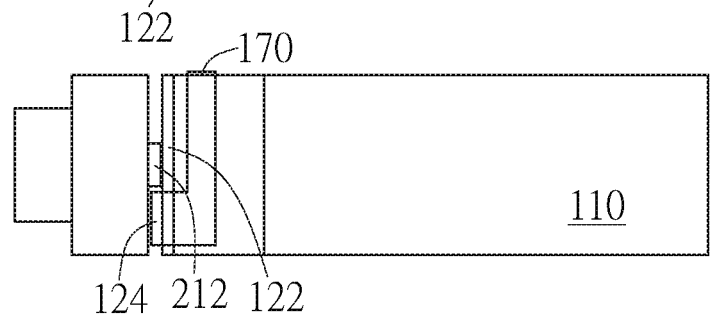
Figure 10I:
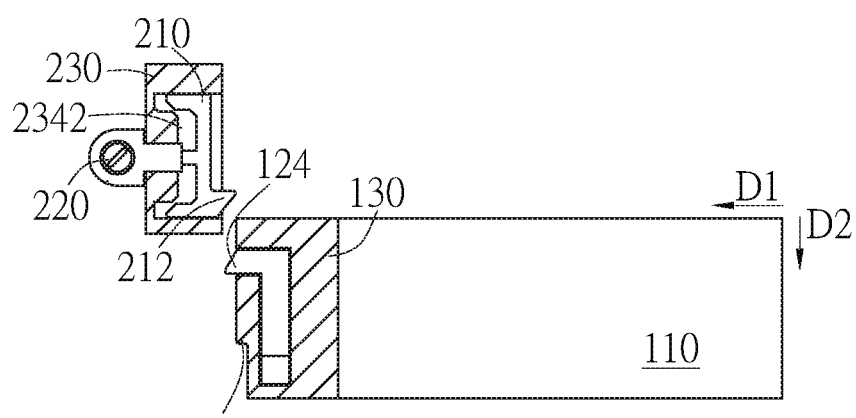
Figure 10J:
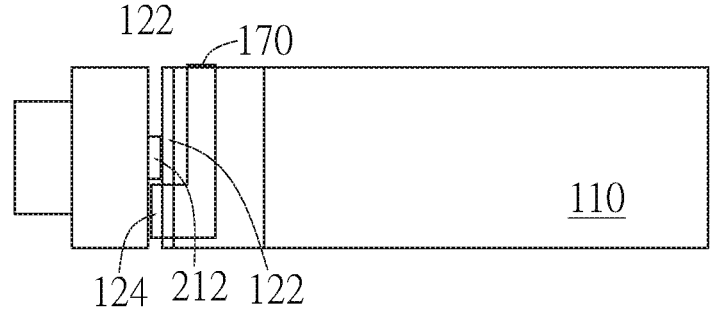

As shown in FIGS. 10E and 10F, when the battery unit is held at the second position, the second engaging portion 124 is allowed to move relative to the first engaging portion 122 toward the lateral side of the battery 110, so that the second engaging portion 124 disengages from the holding member 210 by laterally shifting away from the holding member 210. Specifically, when the user exerts the external force F to the action member 170, for example, the user pushes the action member 170 along a direction parallel to the shorter side into the battery 110, the second engaging portion 124 shifts along the force-exerting direction to be away from the interfering portion 212, as shown in FIGS. 10G and 10H. That is, the length of the second engaging portion 124 protruding from the battery cap 130 toward the holding member 210 maintains unchanged, but the location of the second engaging portion 124 is changed. For example, the projection of the second engaging portion 124 in the detachment direction D2 is no longer overlapping the holding member 210. In this embodiment, the second engaging portion 124 laterally shifts in a direction substantially perpendicular to the detachment direction D2 and the disengagement direction D1. In such a configuration, the engagement between the battery unit and the battery holding unit is released, so that the battery unit is again allowed to move relative to the battery holding unit along the detachment direction D2, such as move downward due to gravity, to be removed from the battery holding unit, as shown in FIGS. 10I and 10J. Moreover, In the case that the battery unit is provided with the resilient member 140 shown in the previous embodiments, after the external force F is released, the resilient member 140 can provide the restoring force to the second engaging portion 124, so that the second engaging portion 124 moves in a reverse direction back to its original position.

Figure 11A:
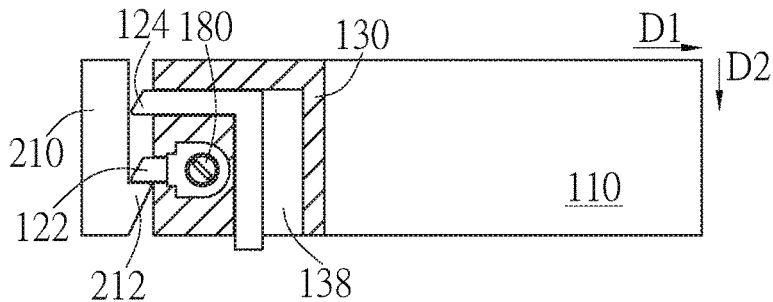
FIGS. 11A to 11E are schematic operation views of the battery assembly in another embodiment of the disclosure.

FIGS. 11A to 11E are schematic operation views of the battery assembly in another embodiment of the disclosure. As shown in FIG. 11A, in this embodiment, the lock device 180 of the battery assembly is disposed on the battery unit 10 to couple with the first engaging portion 122. When the lock device 180 is in the locked state, the holding member 210 and the first engaging portion 122 are immovable relative to each other to maintain engaging with each other. When the lock device 180 is changed to the unlocked state, the first engaging portion 122 is driven to move along the disengagement direction D1 to disengage from the holding member 210. In other words, in this embodiment, the holding member 210 can be a stationary component, and the first engaging portion 122 and the second engaging portion 124 are movable components. Specifically, the lock device 180 may have a structure similar to the lock device 220, and the linking shaft 224 of the lock device 220 may function as the first engaging portion 122 of this embodiment, so that the first engaging portion 122 can extend or retreat in response to the locked or unlocked state of the lock device 180, so as to engage with or disengage from the holding member 210. For example, the second engaging portion 124 may have a structure similar to the embodiment of FIG. 9A to allow the second engaging portion 124 to move forward or backward with respect to the end portion of the battery 110, but not limited thereto. The second engaging portion 124 may have a structure similar to the embodiment of FIG. 10A to allow the second engaging portion 124 to laterally move with respect to the end portion of the battery 110.

Hereinafter, the operations of the battery assembly will be illustrated with reference to FIGS. 11A to 11E. As shown in FIG. 11A, the battery unit is substantially completely mounted or secured to the battery holding unit, and the lock device 180 is in the locked state to restrict the movement of the first engaging portion 122. In such a configuration, the interfering portion 212 of the holding member 210 maintains engaging with the first engaging portion 122 of the battery unit to limit the movement of the battery unit, so that the battery unit is held at the first position, i.e., locked position, at which the battery unit cannot be removed from the battery holding unit. Projections of the second engaging portion 124 and the first engaging portion 122 in the detachment direction D2 at least partially overlap with each other and each projection also at least partially overlaps the interfering portion 212 of the holding member 210.

Figure 11B:
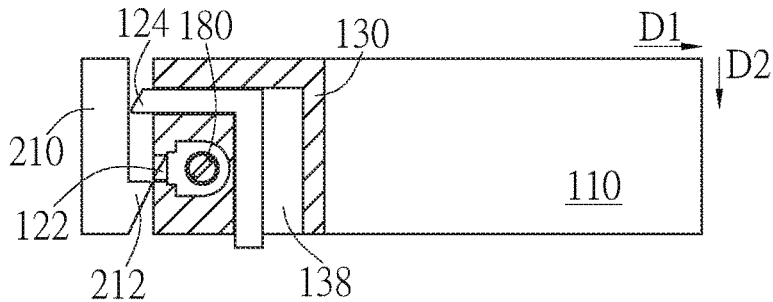
Figure 11C:
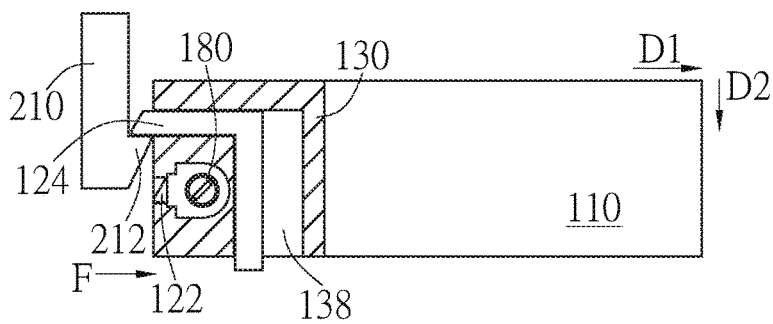

As shown in FIG. 11B, the lock device 180 is changed from the locked state to the unlocked state, and the linking shaft retreats to drive the first engaging portion 122 to move along the disengaging direction D1 away from the interfering portion 212 into the battery 110, so that the holding member 210 and the first engaging portion 122 are disengaged from each other. In such a configuration, the engagement between the battery unit and the battery holding unit is released, so that the battery unit is allowed to move relative to the battery holding unit along the detachment direction D2, such as move downward due to gravity, until the interfering portion 212 engages with the second engaging portion 124, as shown in FIG. 11C. In other words, the lock device 180 is changed from the locked state to the unlocked state to drive the first engaging portion 122 to move away from the moving path of the second engaging portion 124, so that the battery unit moves until the second engaging portion 124 interfering (or engaging) with the interfering portion 212 and then stops to be held at the second position.

Figure 11D:
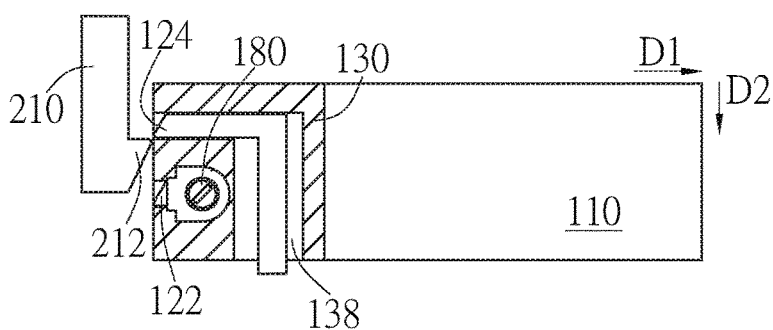
Figure 11E:
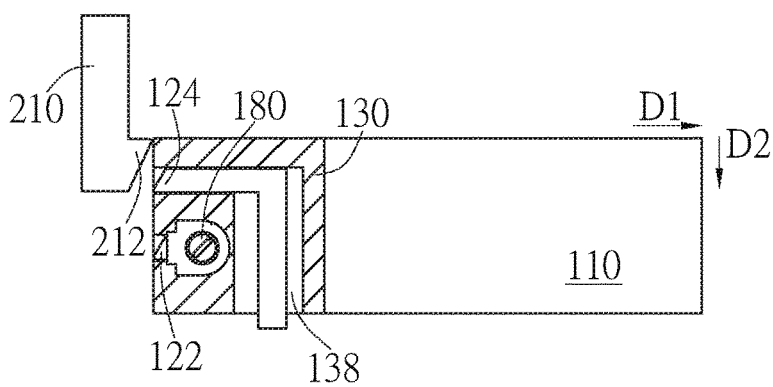

As shown in FIG. 11C, when the battery unit is held at the second position, the second engaging portion 124 is allowed to move relative to the first engaging portion 122 with respect to the end portion of the battery 110 to disengage from the interfering portion 212. Specifically, user can exert an external force F to the operation portion of the second engaging portion 124, such as pushing the operation portion along a direction away from the battery holding unit, so that the second engaging portion 124 moves in the channel 138 along the force-exerting direction (or parallel to the moving direction of the first engaging portion 122) to disengage from the interfering portion 212, as shown in FIG. 11D. In such a configuration, the engagement between the battery unit and the battery holding unit is released, so that the battery unit is again allowed to move relative to the battery holding unit along the detachment direction D2, such as move downward due to gravity, to be removed from the battery holding unit, as shown in FIG. 11E. Moreover, In the case that the battery unit is provided with the resilient member 140 shown in the previous embodiments, after the external force F is released, the resilient member 140 can provide the restoring force to the second engaging portion 124, so that the second engaging portion 124 moves in a reverse direction back to its original position.

Figure 12A:
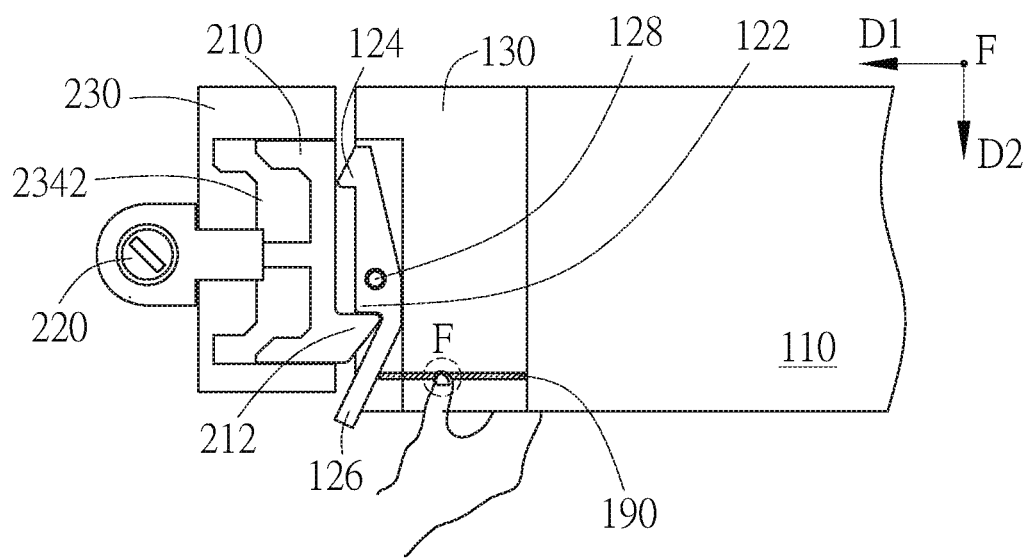
FIG. 12A is a schematic view of the battery assembly in another embodiment of the disclosure.

In the above embodiments, other suitable linking mechanism can be used to couple the operation portion, so as to change the direction of exerting the force to control the operation portion. FIG. 12A is a schematic view of the battery assembly in another embodiment of the invention. In this embodiment, the battery unit further includes an action member 190. The action member 190 is movably disposed at a side of the battery unit. The action member 190 is operated under a force F to push the operation portion 126, so that the second engaging portion 124 moves to disengage from the holding member 210. The force F is exerted from a direction substantially perpendicular to the disengagement direction D1 and/or the detachment direction D2. For example, one end of the action member 190 is coupled to the operation portion 126 of FIG. 7A, and the other end of the action member 190 can be connected to the battery cap 130 (or the battery 110) of the battery unit. The action member 190 is at least partially exposed outside the battery unit and provided for the user to apply the force F to drive the operation portion 126 to move. Hereinafter, referring to FIGS. 12B and 12C, the operations of the action member 190 and the operation portion 126 are described.

Figure 12B:
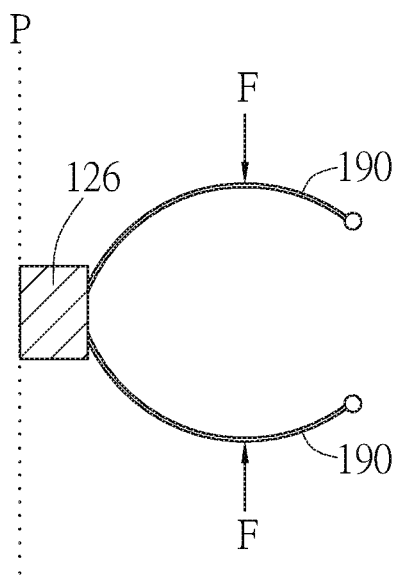
FIGS. 12B and 12C are schematic operation views of the operation portion and the action member in an embodiment of the disclosure.
Figure 12C:
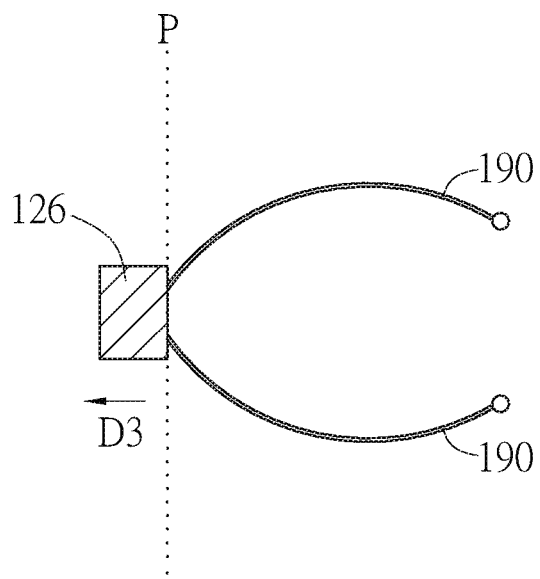

As shown in FIG. 12B, the action member 190 is preferably a deformable member or an elastic plate disposed on two sides of the battery unit. Two ends of the action member 190 are coupled to the operation portion 126 and the battery cap 130 (or the battery 110), respectively. In this embodiment, the action member 190, in response to applying force thereto, can deform to push the operation portion 126, so that the operation portion 126 can move along the moving direction D3 with respect to the reference plane P, as shown in FIG. 12C. For example, when the detachment direction D2 is a downward direction, with the disposition of the action member 190, user can hold the battery unit by one hand and apply force to the action member 190 on two sides of the battery unit by the thumb and the index finger, so that the action member 190 is activated (e.g. elongated) to push the operation portion 126 toward the battery holding unit. As such, the second engaging portion 124 is driven to rotate away from the holding member 210 to disengage from the interfering portion 212. When the force F is released, due to the restoring force of the action member 190, the action member 190 and the operation portion 126 are restored to their original configurations shown in FIG. 12B. In other words, in the embodiment of FIG. 12A, the moving direction D3 and the exerting direction of the force F of FIG. 7C are the same direction. By means of the action member 190, the exerting direction of the force F on the action member 190 is perpendicular to the disengagement direction D1 and the detachment direction D2, to enhance the operation convenience. The action member 190 is not limited to the deformable member or the elastic plate in the embodiment, and the operation of the action member 190 is not limited to deformation. In another embodiment, the action member can be any suitable linking mechanism, such as one or more linking members rotatably coupled to the operation portion 126, so that by means of the rotation or movement of the linking member(s), the movement of the operation portion 126 can be controlled to enhance the operation convenience.

Figure 13A:
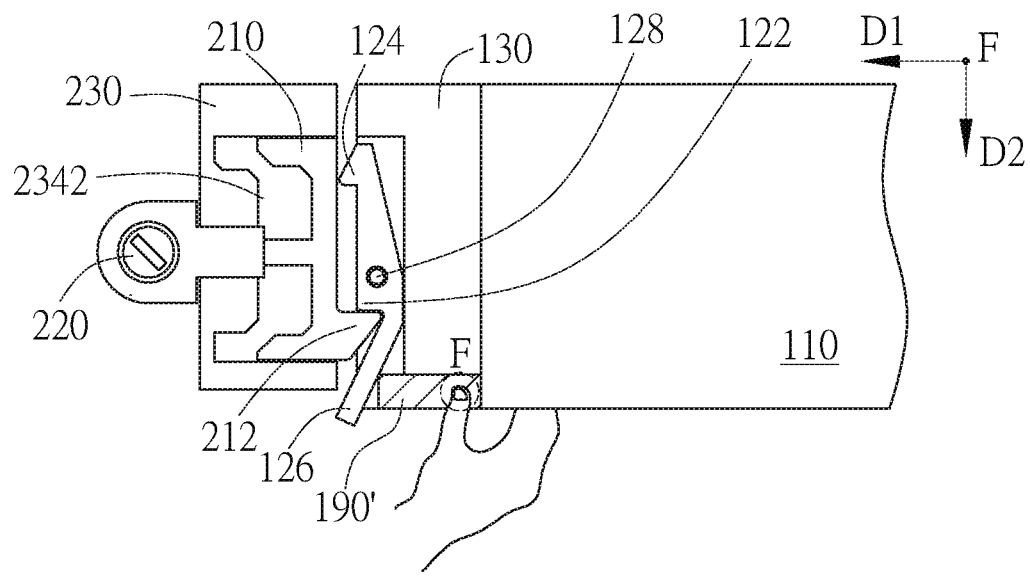
FIG. 13A is a schematic view of the battery assembly in another embodiment of the disclosure.
Figure 13B:
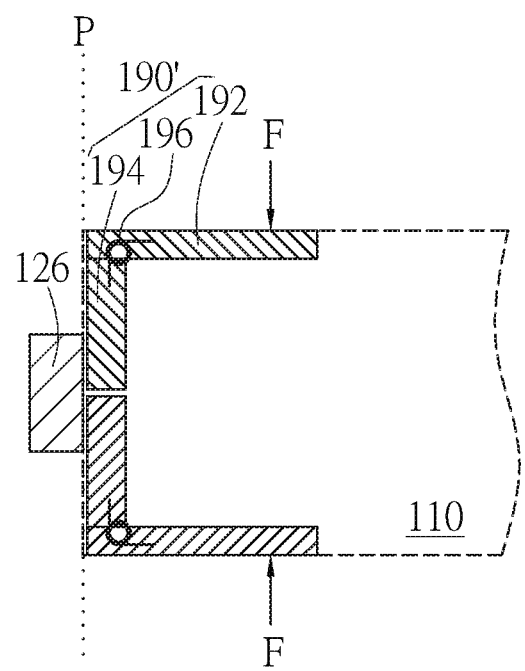
FIGS. 13B and 13C are schematic operation views of the operation portion and the action member in another embodiment of the disclosure.
Figure 13C:
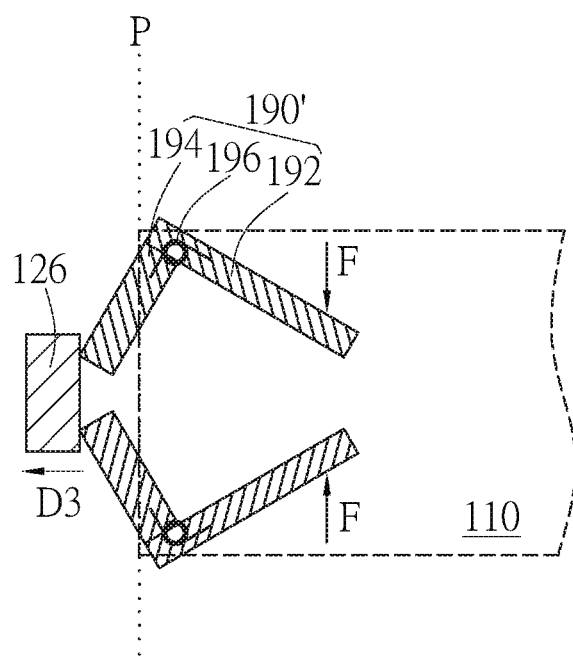

FIG. 13A is a schematic view of the battery assembly in another embodiment of the disclosure. FIGS. 13B and 13C are schematic operation views of the operation portion 126 and the action member 190' in another embodiment of the disclosure, wherein FIGS. 13B and 13C are plane views from the detachment direction D2 of the battery unit. As shown in FIGS. 13A and 13B, in this embodiment, the action member 190' includes a plurality of linking members 192, 194 and a resilient member 196, which construct the linking mechanism with the operation portion 126. For example, the linking members 192, 194 can be embodied as linking bars, and the resilient member 196 can be embodied as a torsion spring. In this embodiment, two sets of action members 190 are preferably disposed on two sides of the battery unit. The linking member 192 extends from one side of the battery unit toward the operation portion 126 and couples to the linking member 194. The torsion spring type resilient member 196 is disposed at the pivot joint of the linking members 192 and 194. The other end of the linking member 194 opposite to the linking member 192 is coupled to the operation portion 126. The action member 190' may be pivotally coupled to the housing of the battery or the battery cap 130. Two ends of the torsion spring couple to the linking members 192 and 194, respectively. As shown in FIGS. 13B and 13C, when the action member 190' is operated under a force, such as user applying the force F to the free end of the linking member 192, the action member 190' rotates about the pivot joint and compresses the torsion spring to push the operation portion 126 along the moving direction D3 with respect to the reference plane P, so that the movable member 120 is driven to rotate, and the second engaging portion 124 moves away and disengages from the holding member 210 to allow the battery unit to be removed from the battery holding unit. When the force F is released, due to the restoring force of the torsion spring (i.e. the resilient member 196), the action member 190' and the operation portion 126 are restored to their original configurations shown in FIG. 13B.

Although the preferred embodiments of the present disclosure have been described herein, the above description is merely illustrative. The preferred embodiments disclosed will not limit the scope of the present disclosure. Further modification of the disclosure herein disclosed will occur to those skilled in the respective arts and all such modifications are deemed to be within the scope of the disclosure as defined by the appended claims.

What is claimed is:
1. A battery assembly, comprising:
a battery unit comprising a battery, a first engaging portion, and a second engaging portion, the first engaging portion and the second engaging portion disposed on an end portion of the battery, the second engaging portion being movable relative to the end portion;
a battery holding unit, the battery unit removably held by the battery holding unit, the battery holding unit comprising a holding member, the holding member configured to engage with the first engaging portion to hold the battery unit at a first position or to engage with the second engaging portion to hold the battery unit at a second position; and
a lock device coupling with the holding member or the first engaging portion, wherein when the lock device is in a locked state, the holding member and the first engaging portion are immovable relative to each other to maintain engagement with each other; when the lock device is changed to an unlocked state, one of the holding member and the first engaging portion is driven to move along a disengagement direction to disengage from each other,
wherein the second engaging portion and the first engaging portion are respectively disposed at an upstream and a downstream along a detachment direction along which the battery unit leaves the battery holding unit from the upstream to the downstream; when the holding member and the first engaging portion relatively move away from each other along the disengagement direction to change a relative position between the holding member and the first engaging portion along the disengagement direction, the battery unit moves along the detachment direction from the first position to the second position at which the same holding member engages with the second engaging portion, and the second engaging portion is allowed to move relative to the end portion to disengage from the holding member, so that the battery unit moves again along the detachment direction to be removed from the battery holding unit.

2. The battery assembly of claim 1, wherein the lock device is disposed on the battery holding unit to couple with the holding member; when the lock device is changed to the unlocked state, the holding member is driven to move along the disengagement direction to disengage from the first engaging portion.

3. The battery assembly of claim 2, wherein the second engaging portion is movable relative to the first engaging portion; when the battery unit is held at the second position, the second engaging portion is allowed to move toward the battery with respect to the first engaging portion to disengage from the holding member.

4. The battery assembly of claim 2, wherein the second engaging portion is movable relative to the first engaging portion; when the battery unit is held at the first position, a projection of the second engaging portion in the detachment direction at least partially falls outside the first engaging portion; when the battery unit is held at the second position, the second engaging portion is allowed to move relative to the first engaging portion toward a lateral side of the battery, so that the second engaging portion disengages from the holding member by laterally shifting away from the holding member.

5. The battery assembly of claim 4, wherein the second engaging portion laterally shifts in a direction substantially perpendicular to the detachment direction and the disengagement direction.

6. The battery assembly of claim 4, wherein the battery unit further comprises an operation portion disposed corresponding to the second engaging portion; the operation portion is operated under a force to drive the second engaging portion to move relative to the first engaging portion toward the lateral side of the battery, so that the projection of the second engaging portion in the detachment direction does not overlap the holding member.

7. The battery assembly of claim 1, wherein the lock device is disposed on the battery unit to couple with the first engaging portion; when the lock device is changed to the unlocked state, the first engaging portion is driven to move along the disengagement direction to disengage from the holding member.

8. The battery assembly of claim 7, wherein when the battery unit is held at the second position, the second engaging portion is allowed to move relative to the holding member toward the battery to disengage from the holding member.

9. A battery assembly, comprising:
a battery unit comprising a battery, a first engaging portion, and a second engaging portion, the first engaging portion and the second engaging portion disposed on an end portion of the battery, the second engaging portion being movable relative to the end portion; and
a battery holding unit, the battery unit removably held by the battery holding unit, the battery holding unit comprising a holding member, the holding member configured to engage with the first engaging portion to hold the battery unit at a first position or to engage with the second engaging portion to hold the battery unit at a second position,
wherein when the holding member and the first engaging portion relatively move away from each other along a disengagement direction, the battery unit moves along a detachment direction from the first position to the second position at which the holding member engages with the second engaging portion, and the second engaging portion is allowed to move relative to the end portion to disengage from the holding member, so that the battery unit moves again along the detachment direction to be removed from the battery holding unit; and
wherein the battery unit comprises a movable member; the first engaging portion and the second engaging portion are disposed on the movable member along the detachment direction; when the battery unit is held at the first position, a projection of the second engaging portion in the detachment direction at least partially falls outside the first engaging portion.

10. The battery assembly of claim 1, wherein the battery holding unit further comprises a base; the holding member is disposed on the base; the base has a barrier portion; when the battery unit is held at the first position, the barrier portion corresponds to the second engaging portion.

11. The battery assembly of claim 1, wherein the battery holding unit further comprises a base; the holding member is disposed on the base; the battery unit has a guiding groove at the end portion; the base is relatively movable along the guiding groove, so that the battery unit is guided to move relative to the battery holding unit.

12. The battery assembly of claim 1, wherein the battery holding unit further comprises a base; the holding member is disposed on the base; the battery unit has a recessed portion at the end portion; an outer wall of the base is relatively movable along an inner wall of the recessed portion, so that the battery unit is guided to move relative to the battery holding unit.

13. The battery assembly of claim 1, wherein the battery holding unit further comprises a base; the holding member is disposed on the base; the base has a guiding surface at a side facing the battery unit; the battery unit has a guiding wall at the end portion; the guiding wall of the battery unit is movable along the guiding surface of the base, so that the battery unit is guided to move relative to the battery holding unit.

14. The battery assembly of claim 1, wherein the disengagement direction is substantially perpendicular to the detachment direction.

15. The battery assembly of claim 9, wherein the battery unit further comprises a resilient member disposed between the movable member and the end portion of the battery; the resilient member provides a restoring force to enable the projection of the second engaging portion in the detachment direction to be maintained partially outside the first engaging portion.

16. The battery assembly of claim 9, wherein the movable member is rotatably disposed on the end portion of the battery and further has an operation portion; the first engaging portion is disposed between the second engaging portion and the operation portion; the operation portion is operated to rotate the movable member, so that the second engaging portion moves away from the holding member to disengage from the holding member.

17. The battery assembly of claim 16, wherein the operation portion rotatably couples to an end of the movable member neighboring the first engaging portion.

18. The battery assembly of claim 16, wherein the battery unit further comprises an action member movably disposed at a side of the battery; the action member is operated under a force to push the operation portion, so that the second engaging portion disengages from the holding member; the force is exerted from a direction substantially perpendicular to the disengagement direction and/or the detachment direction.

19. The battery assembly of claim 18, wherein when the force is exerted, the action member deforms or rotates to push the operation portion.

20. A battery assembly, comprising:
a battery unit comprising a battery, a first engaging portion, and a second engaging portion, the first engaging portion and the second engaging portion disposed on an end portion of the battery, the second engaging portion being movable relative to the end portion; and
a battery holding unit, the battery unit removably held by the battery holding unit, the battery holding unit comprising a holding member, the holding member configured to engage with the first engaging portion to hold the battery unit at a first position or to engage with the second engaging portion to hold the battery unit at a second position, wherein when the holding member and the first engaging portion relatively move away from each other along a disengagement direction, the battery unit moves along a detachment direction from the first position to the second position at which the holding member engages with the second engaging portion, and the second engaging portion is allowed to move relative to the end portion to disengage from the holding member, so that the battery unit moves again along the detachment direction to be removed from the battery holding unit; and wherein the holding member has an interfering portion and a barrier portion; the holding member selectively engages with the first engaging portion or the second engaging portion by the interfering portion to hold the battery unit at the first position or the second position; when the battery unit is held at the first position, the barrier portion corresponds to the second engaging portion.

* * * * *